(12) United States Patent
Rajan

(10) Patent No.: US 8,566,845 B2
(45) Date of Patent: Oct. 22, 2013

(54) SYSTEM AND METHOD FOR OPTIMIZING MULTI-PATHING SUPPORT IN A DISTRIBUTED STORAGE SYSTEM ENVIRONMENT

(75) Inventor: Vijayan Rajan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1452 days.

(21) Appl. No.: 11/748,344

(22) Filed: May 14, 2007

(65) Prior Publication Data

US 2007/0244908 A1 Oct. 18, 2007

Related U.S. Application Data

(63) Continuation of application No. 11/588,097, filed on Oct. 26, 2006, now abandoned.

(60) Provisional application No. 60/731,532, filed on Oct. 28, 2005.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ......................................................... 719/327

(58) Field of Classification Search
USPC .......................................................... 719/327
See application file for complete search history.

(56) References Cited

U.S. PATENT DOCUMENTS

| 4,899,342 A | 2/1990 | Potter et al. |
|---|---|---|
| 4,916,608 A | 4/1990 | Shultz |
| 4,989,206 A | 1/1991 | Dunphy, Jr. et al. |
| 5,124,987 A | 6/1992 | Milligan et al. |
| 5,155,835 A | 10/1992 | Belsan |
| 5,163,131 A | 11/1992 | Row et al. |

(Continued)

FOREIGN PATENT DOCUMENTS

| EP | 0 892 347 | 1/1999 |
|---|---|---|
| JP | 10003440 A | 6/1998 |
| WO | WO 00/07101 A1 | 2/2000 |

OTHER PUBLICATIONS

U.S. Appl. No. 60/731,532, filed Oct. 28, 2005, entitled System and Method for Optimizing Multi-Pathing Support in a Distributed Storage System Environment, by Rajan et al., 71 pages.

(Continued)

*Primary Examiner* — Lechi Truong
*Assistant Examiner* — Timothy A Mudrick
(74) *Attorney, Agent, or Firm* — Cesari and McKenna, LLP

(57) ABSTRACT

A Multi-Pathing Optimization Module (MPOM) interfaces with a client to route a data access request along a most optimal path to a storage system serving data container stored on a striped volume set (SVS). The MPOM constructs and references a Location Data Structure (LDS) containing striping rules associated with the SVS, a list of network elements (N-blades) operatively connected to the client, and a list of disk elements (D-blades) sharing a node of the storage system with the listed N-blades. The MPOM executes a Client_Locate( ) function on a per data access request basis to identify the D-blade serving the volume which will receive the request. When possible, the MPOM routes the data access request directly to the N-blade sharing a node with the identified D-blade, thereby using the most optimal path from the client to the SVS.

43 Claims, 18 Drawing Sheets

(56) References Cited

U.S. PATENT DOCUMENTS

| | | | |
|---|---|---|---|
| 5,202,979 A | 4/1993 | Hillis et al. | |
| 5,355,453 A | 10/1994 | Row et al. | |
| 5,485,579 A | 1/1996 | Hitz et al. | |
| 5,581,724 A | 12/1996 | Belsan et al. | |
| 5,668,943 A | 9/1997 | Attanasio et al. | |
| 5,701,516 A | 12/1997 | Cheng et al. | |
| 5,802,366 A | 9/1998 | Row et al. | |
| 5,819,292 A | 10/1998 | Hitz | |
| 5,897,661 A | 4/1999 | Baranovsky et al. | |
| 5,931,918 A | 8/1999 | Row et al. | |
| 5,941,972 A | 8/1999 | Hoese et al. | |
| 5,963,962 A | 10/1999 | Hitz et al. | |
| 5,987,477 A | 11/1999 | Schmuck et al. | |
| 6,032,216 A | 2/2000 | Schmuck et al. | |
| 6,038,570 A | 3/2000 | Hitz et al. | |
| 6,065,037 A | 5/2000 | Hitz et al. | |
| 6,173,293 B1 | 1/2001 | Thekkath et al. | |
| 6,185,619 B1 * | 2/2001 | Joffe et al. | 709/229 |
| 6,275,898 B1 | 8/2001 | DeKoning | |
| 6,324,581 B1 | 11/2001 | Xu et al. | |
| 6,425,035 B2 * | 7/2002 | Hoese et al. | 710/315 |
| 6,502,166 B1 | 12/2002 | Cassidy | |
| 6,529,963 B1 * | 3/2003 | Fredin et al. | 710/1 |
| 6,564,252 B1 | 5/2003 | Hickman et al. | |
| 6,606,690 B2 | 8/2003 | Padovano | |
| 6,636,879 B1 | 10/2003 | Doucette et al. | |
| 6,643,654 B1 | 11/2003 | Patel et al. | |
| 6,671,773 B2 | 12/2003 | Kazar | |
| 6,675,268 B1 | 1/2004 | DeKoning et al. | |
| 6,697,846 B1 | 2/2004 | Soltis | |
| 6,721,764 B2 | 4/2004 | Hitz et al. | |
| 6,732,124 B1 * | 5/2004 | Koseki et al. | 1/1 |
| 6,842,810 B1 * | 1/2005 | Fitzgerald et al. | 710/240 |
| 6,868,417 B2 | 3/2005 | Kazar et al. | |
| 6,931,450 B2 | 8/2005 | Howard et al. | |
| 6,978,283 B1 | 12/2005 | Edwards et al. | |
| 7,010,528 B2 | 3/2006 | Curran et al. | |
| 7,038,058 B2 | 5/2006 | Lee et al. | |
| 7,159,093 B2 | 1/2007 | Dalal et al. | |
| 7,162,486 B2 | 1/2007 | Patel et al. | |
| 7,185,144 B2 | 2/2007 | Corbett et al. | |
| 7,194,597 B2 | 3/2007 | Willis et al. | |
| 7,231,412 B2 | 6/2007 | Hitz et al. | |
| 7,302,520 B2 | 11/2007 | Kazar et al. | |
| 7,366,837 B2 | 4/2008 | Corbett et al. | |
| 7,409,494 B2 | 8/2008 | Edwards | |
| 7,409,497 B1 | 8/2008 | Jernigan et al. | |
| 7,412,496 B2 | 8/2008 | Fridella et al. | |
| 7,698,289 B2 | 4/2010 | Kazar et al. | |
| 7,698,501 B1 | 4/2010 | Corbett et al. | |
| 2001/0037406 A1 * | 11/2001 | Philbrick et al. | 709/250 |
| 2001/0050915 A1 * | 12/2001 | O'Hare et al. | 370/400 |
| 2002/0049883 A1 | 4/2002 | Schneider et al. | |
| 2002/0103913 A1 * | 8/2002 | Tawil et al. | 709/229 |
| 2003/0188045 A1 | 10/2003 | Jacobson | |
| 2004/0030668 A1 | 2/2004 | Pawlowski et al. | |
| 2004/0064633 A1 * | 4/2004 | Oota | 711/100 |
| 2004/0122917 A1 | 6/2004 | Menon et al. | |
| 2004/0133570 A1 | 7/2004 | Soltis | |
| 2004/0139167 A1 | 7/2004 | Edsall et al. | |
| 2005/0097260 A1 | 5/2005 | McGovern et al. | |
| 2005/0192932 A1 | 9/2005 | Kazar | |
| 2006/0184587 A1 | 8/2006 | Federwisch et al. | |
| 2006/0184731 A1 | 8/2006 | Corbett et al. | |
| 2007/0088702 A1 | 4/2007 | Fridella et al. | |

OTHER PUBLICATIONS

Network Appliance, Inc., PCT Notification of Transmittal of the International Search Report and the Written Opinion of the International Searching Authority, or the Declaration, International Filing No. PCT/US2006/041341, International Filing Date: Oct. 23, 2006, Date of Document Mailing: Apr. 24, 2007, 7 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Administration Guide found at http://www.openafs.org/pages/doc/AdminGuide/auagd010.htm, visited on Mar. 2, 2005, 34 pages.

Auspex Systems, LFS—A Local File System for Multiprocessor NFS Network Servers, 1994, 6 pages.

Blasgen, M.W. et al., System R: An architectural Overview, Reprinted from IBM Systems Journal vol. 20, No. 1, 1981, COPYRIGHT 1981, 1999, 22 pages.

Borenstein, Nathaniel S., CMU's Andrew project a retrospective, Communications of ACM, 39(12), Dec. 1996, 33 pages.

Brown, Mark R. et al., The Alpine file system, ACM Transactions on Computing Systems, 3(4):261-293, Nov. 1985.

Carns, P. H., et al, "PVFS: A Parallel File System for Linux Clusters", Proceedings of the 4.sup.th Annual Linux Showcase and Conference, Atlanta, GA, Oct. 2000, pp. 317-327.

Celerra File Server Architecture for High Availability, EMC2 where information lives, Aug. 1999, 12 pages.

Chutani, Sailesh, et al., The Episode File System, In Proceedings of the USENIX Winter 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4). Fall 1991, pp. 353-385.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hartman, J. H., et al., "Zebra: A Striped Network File System" Proceedings of the USENIX File Systems Workshop, Apr. 1998, pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

(56) References Cited

OTHER PUBLICATIONS

Miller, Ethan L., et al., RAMA: A File System for Massively Parallel Computers, 12.sup.th IEEE Symposium on Mass Storage Systems, Monterey CA, Apr. 1993, pp. 163-168.
Morris, James H., et al., Andrew: A Distributed Personal Computing Environment, Comm. of the ACM, vol. 29, Mar. 1986, pp. 184-201.
Nelson, Michael et al., "Caching in the Sprite Network File System", ACM, Nov. 1987, pp. 3-4.
Ousterhout, John K. et al., The Sprite Network Operating System, Computer Science Division, Department of Electrical Engineering and Computer Sciences, Univ. of CA, Berkley, Nov. 19, 1987, 32 pages.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.
Performance Without Compromise: The Virtual Storage Architecture 1997, 11 pages.
Quinlan, Sean, A Cached WORM File System, Software-Practice and Experience, 21(12):1289-1299 (1991).
Rosenberg, J., et al., Stability in a Persistant Store Based on a Large Virtual Memory, in Security and Persistence, Rosenber, J. & Keedy, J.L. (ed), Springer-Verlag (1990) pp. 229-245.
Rosenblum, Mendel, et al. The Design and Implementation of a Log-Structured File System Jul. 24, 1991 pp. 1-15.
Rosenblum, Mendel, The Design and Implementation of a Log-Structured File System, 1992, pp. 1-93.
Rosenblum, Mendel, et al., The Design and Implementation of a Log-Structured File System, In Proceedings of ACM Transactions on Computer Systems, (10)1:26-52, Feb. 1992.
Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.
Ross, R. B. et al., "Using the Parallel Virtual File System", Jul. 2002, 31 pages.
Sandberg, Russel et al., Design and implementation of the Sun Network Filesystem. In Proc. Summer 1985 USENIX Conf., pp. 119-130, Portland OR (USA), Jun. 1985.
Santry, Douglas S., et al., Deciding When to Forget in the Elephant File System, Operating Systems Review, 34(5), (Dec. 1999) pp. 110-123.
Satyanarayanan, M., et al., The ITC Distributed File System: Principles and Design, In Proceedings of 10th ACM Symposium on Operating Systems Principles, (19)5:56-67, Dec. 1985.
Satyanarayanan, M., A survey of distributed file-systems. Annual Review of Computing Science, 4(73-104), 1989.
Satyanarayanan, M., et al., Coda: A highly, available file system for a distributed workstation environment Carnegie Mellon University, CMU-ITC, pp. 1-15.
Satyanarayanan, M., et al., Coda: A highly available file system for a distributed workstation environment. IEEE Transactions on Computers, 39(4):447-459, 1990.
Satyanarayanan, M., Scalable, Secure, and Highly Available Distributed File Access, Computer May. 1990:9-21.
Seltzer, Margo I., et al., Journaling Versus Soft Updates: Asynchronous Meta-Data Protection in file Systems, Proceedings of 200 USENIX Annual Technical Conference, Jun. 18-23, 2000, pp. 1-15.
Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.
Sidebotham, Bob, Volumes: The Andrew File System Data Structuring Primitive, EEUG Conference Proceedings, Manchester, UK, Autumn 1986.
Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.
Subramanian, Muralidhar, et al., Performance Challenges in Object-Relational DBMSs, Data Engineering Journal 22, Feb. 1999 pp. 28-32.
Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.
Welch, Brent B., et al., Pseudo-File-Systems, Computer Science Division, Department of Electrical Engineering and Computer Sciences. Univ. of CA, Berkley, Oct. 1989, 22 pages.
West, Michael, et al. The ITC Distributed File System: Prototype and Experience, Carnegie-Mellon University, Technical Report CMU-ITC-040, Mar. 1985, 17 pages.
"Notification of Transmittal of the International Search Reoprt and the Written Opinion of the International Searching Authority, or the Declaration", International Application No. PCT/US2006/016055, International Filing Date Apr. 27, 2006, Mailing Date Nov. 9, 2006, 10 pages.
Brinkmann et al., "Efficient, Distributed Data Placement Strategies for Storage Area Networks", Proc. of the 12th ACM Symp. on Parallel Algorithms and Architectures (SPAA), ACM Press. 2000, pp. 119-128.
Ganger, Gregory R. et al., "Disk Subsystem Load Balancing: Disk Striping vs. Coventional Data Placement", Department of Electrical Engineering and Computer Science, University of Michigan, Ann Arbor, Jan. 5, 1993, 10 pages.
Honicky, R.J. et al., "A Fast Algorith for Online Placement and Reorganization of Replicated Data", Storage Systems Research Center, University of California, Santa Cruz, Apr. 22, 2003, 10 pages.
Ho, T.K. et al., "A Row Permutated Data Reorganization Algorithm for Growing Server-less Video-on-demand Systems", Department of Information Engineering, the Chinese University of Hong Kong, Shatin, N.T., Hong Kong, May 12, 2003, 8 pages.
Rajan, Vijayan, "System and Method for Optimizing Multi-Pathing Support in a Distributed Storage System Environment", U.S. Appl. No. 11/588,097, filed Oct. 26, 2006, 71 pages.

* cited by examiner

SYSTEM AND METHOD FOR OPTIMIZING MULTI-PATHING SUPPORT IN A DISTRIBUTED STORAGE SYSTEM ENVIRONMENT

CROSS-REFERENCE TO RELATED APPLICATIONS

The present application is a continuation of U.S. patent application Ser. No. 11/588,097, which was filed on Oct. 26, 2006, by Vijayan Rajan for A SYSTEM AND METHOD FOR OPTIMIZING MULTI-PATHING SUPPORT IN A DISTRIBUTED STORAGE SYSTEM ENVIRONMENT and is incorporated herein by reference, now abandoned and is incorporated herein by reference.

The present application claims the benefit of U.S. Provisional Patent Application Ser. No. 60/731,532, which was filed on Oct. 28, 2005, by Vijayan Rajan for a SYSTEM AND METHOD FOR OPTIMIZING MULTI-PATHING SUPPORT IN A DISTRIBUTED STORAGE SYSTEM ENVIRONMENT and is hereby incorporated by reference.

RELATED APPLICATION

The present application is related to U.S. patent application Ser. No. 11/119,278, entitled STORAGE SYSTEM ARCHITECTURE FOR STRIPING DATA CONTAINER CONTENT ACROSS VOLUMES OF A CLUSTER, by Michael Kazar, et al., now issued as U.S. Pat. No. 7,698,289 on Apr. 13, 2010, the contents of which are hereby incorporated by reference

FIELD OF THE INVENTION

The present invention relates to storage systems and, in particular, to optimizing multi-pathing support for performing input/output operations directed to a data container striped across a plurality of volumes on one or more storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). RAID implementations enhance the reliability/integrity of data storage through the redundant writing of data "stripes" across a given number of physical disks in the RAID group, and the appropriate storing of redundant information (parity) with respect to the striped data. As described herein, a volume typically comprises at least one data disk and one associated parity disk (or possibly data/parity partitions in a single disk) arranged according to a RAID 4 or equivalent high-reliability implementation. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. In the case of block-based protocol packets, the client requests (and storage system responses) address the information in terms of block addressing on disk using, e.g., a logical unit number (lun).

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. One technique for data container striping is described in the above-incorporated U.S. Pat. No. 7,698,289, entitled STORAGE SYSTEM ARCHITECTURE FOR STRIPING DATA CONTAINER CONTENT ACROSS VOLUMES OF A CLUSTER. Here, stripes of content (data) of a data container are allocated to each volume of the SVS in a manner that balances data across the volumes of the SVS. In addition, various volumes of the SVS are configured to store ("cache") meta-data associated with the container. As described in the above-incorporated patent application, a SVS may be utilized on a storage system that services both file-based and block-based data access requests. As such, a data container may by a file or other file system entity or may by a logical unit number that is accessible via block-based requests such as SCSI, iSCSI or FCP.

By striping the content of a data container across the volumes of a SVS, the load on the storage system environment is distributed across a plurality of nodes between the clients and the SVS volumes. Illustratively, each node comprises a network element (N-blade) and a disk element (D-blade). Each N-blade includes functionality that enables the node to connect to clients over a computer network, whereas each D-blade manages data storage on one or more storage devices. Within a node, the N and D-blade share a high bandwidth system bus, and, between the nodes, each N-blade is operatively interconnected to every other D-blade by a cluster switching fabric, which may be, e.g., a Gigabit Ethernet switch. Generally, the system bus within a node has higher bandwidth and/or lower latency than the cluster switching fabric which interconnects the nodes. Each N-blade contains functionality, e.g., a Locate( ) function, that enables it to identify the appropriate D-blade to route a given data access request for processing. It should be noted that all N and D-blades are not necessarily paired into nodes, as there may be more N-blades than D-blades (or vice versa) depending on the storage system architecture. Thus, some N-blades may lack a direct system bus connection to a D-blade, or vice versa. The N or D-blades lacking a direct system bus connection utilize only the cluster switching fabric for intra-cluster communication.

Although all data access requests may be directed to any N-blade, which then routes the requests to the appropriate D-blade to thereby balance the bandwidth and processing load on all D-blades and disk volumes, it is desirable to optimize the storage system by balancing the bandwidth and processing load on all N-blades. One solution is to equally divide all data access requests from a client among all available N-blades, presumably balancing the bandwidth and processing load among N-blades. Another solution is to utilize, e.g., a least-queue-depth algorithm to balance the load across all paths between the client and the N-blades. Under either solution, the N-blades route the data access requests to the appropriate D-blades via either the high bandwidth system bus within a particular node or the cluster switching fabric among the nodes, as necessary.

Although the above-mentioned solutions balance the bandwidth and processing load among all N-blades, it is additionally desirable to optimize the storage system by reducing traffic on the cluster switching fabric interconnecting the N and D-blades. In most applications, the shared system bus between the N and D-blades within a node is the most optimal route for a data access request to follow since, as noted, the system bus generally has higher bandwidth and lower latency than the cluster switching fabric. Thus the techniques for balancing bandwidth and processing load among all N-blades, using either equal load division or a least-queue-depth algorithm, fail to achieve the most optimal data flow through the storage system because they utilize primarily the cluster switching fabric, rather than the shared system bus within each node, to route data access requests to the appropriate D-blades.

SUMMARY OF THE INVENTION

The present invention overcomes the disadvantages of the prior art by providing a system and method for determining and accessing, on a per data access request basis, a most optimal path from a client to one of a plurality of nodes of a cluster configured to serve a plurality of striped volume sets (SVSs). Each node is illustratively embodied as a storage system comprising a disk element (D-blade) adapted to serve a volume of a SVS and a network element (N-blade) adapted to direct a data access request to any D-blade of the cluster. A Multi-Pathing Optimization Module (MPOM) resides on the client, or between the client and the storage system, and includes a Client_Locate( ) function that identifies the most optimal path to use when sending a data access request directed to a data container serviced by the cluster. For each SVS that the client accesses, the associated MPOM constructs a Location Data Structure (LDS) containing striping rules associated with the SVS, a list of N-blades connected to the client, and a list of D-blades, each of which is locally connected to a listed N-blade via a high bandwidth system bus.

Illustratively, the LDS resides in memory on the client and is updated upon initialization of the MPOM and periodically thereafter. To update the LDS, the client sends an Update LDS Command to the storage systems operatively connected to the client, and, in response, the systems reply with Update LDS Responses. The Update LDS Commands and the Update LDS Responses are illustratively implemented as vendor-specific SCSI commands, however, in alternate embodiments, they may be implemented using other techniques. Each Update LDS Response contains the striping rules associated with the SVS and an index to the local D-blade, if any, sharing the system bus with the N-blade. The striping rules include a striping algorithm, a stripe width, and a number of striped volumes comprising the SVS. Illustratively, each D-blade index identifies the D-blade relative to the striping rules such that a sequence of volumes across which data is striped corresponds to a sequence of indices to the D-blades serving those volumes. Thus, the D-blades are indexed according to the striping algorithm. The MPOM pairs the indices of local D-blades to indices for the N-blades such that each pairing corresponds to a storage system, and the MPOM writes this information to the LDS. In essence, the MPOM associated with the client retrieves and stores the necessary information for executing the Client_Locate( ) function and for routing a data access request over the optimal path.

Operationally, a data access request from the client to the data container stored on the SVS is intercepted by the MPOM, which executes the Client_Locate( ) function to identify the appropriate N-blade associated with the optimal path. Given an offset within a data container stored on a SVS, the Client_Locate( ) function retrieves the striping rules from the LDS to identify the D-blade index for the volume containing the desired data. The MPOM then checks the list of local D-blade indices previously provided by the N-blades during initialization to determine whether the identified D-blade index is paired with an N-blade index. When the client possesses an operative connection to an N-blade having a high bandwidth connection to the identified D-blade, the pairing of an N-blade index to the identified D-blade index identifies a corresponding storage system, and the data access request is routed to this system to optimize performance. Specifically, the MPOM routes the request to the N-blade paired with the identified D-blade in the LDS. Conversely, when the client lacks an operative connection to an N-blade having a high bandwidth connection to the identified D-blade, there is no pairing of an N-blade index to the identified D-blade index, and the MPOM defaults to an alternative method for selecting an N-blade to which to route the data access request (e.g., using a least-queue-depth algorithm). Thus, when possible, the MPOM routes a data access request along the most optimal path from a client to a storage system serving a SVS by routing the request directly to the N-blade residing on the same storage system as the D-blade identified by the Client_Locate( ) function, thereby utilizing the high bandwidth connection between the N and D-blades, rather than the cluster switching fabric.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Cluster Environment

Figure 1:
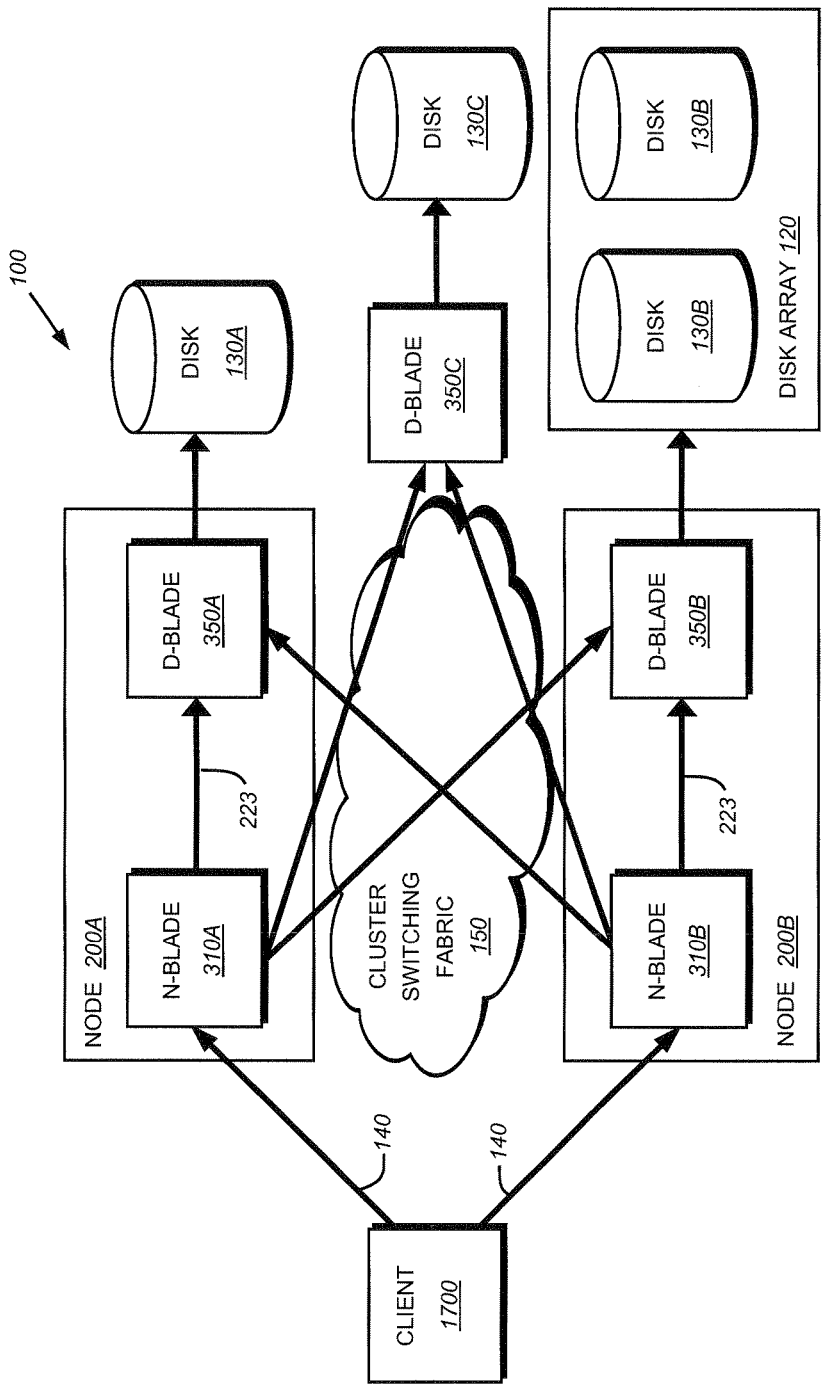
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350) interconnected by a high bandwidth connection (system bus 223). The N-blade 310 includes functionality that enables the node 200 to connect to clients 1700 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. That is, although N-blade 310A and D-blade 350A comprise node 200A and N-blade 310B and D-blade 350B comprise node 200B, D-blade 350C is not associated with any N-blade in a node configuration. Such a cluster configuration may be utilized to permit additional load balancing of disk operations in an environment where additional network processing, i.e., N-blades, is not necessary. As such, the description of a node 200 comprising one N-blade and one D-blade should be taken as illustrative only.

The clients 1700 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
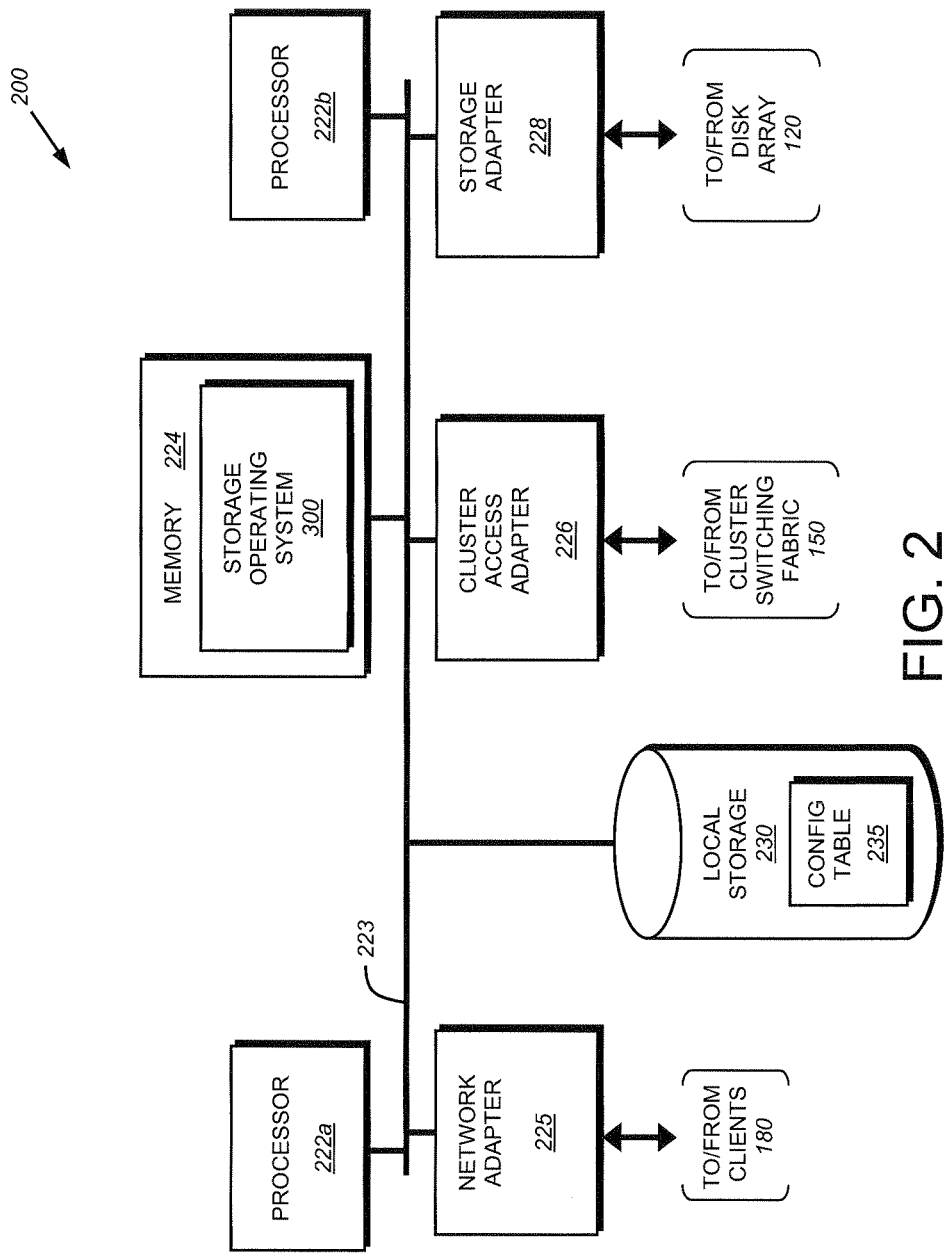
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a high bandwidth connection 223. The local storage 230 comprises one or more storage devices, such as disks, utilized by the node to locally store configuration information (e.g., in configuration table 235) provided by one or more management processes that execute as user inode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. Illustratively, the high bandwidth connection 223 is a system bus, e.g., a Peripheral Component Interconnect (PCI) bus, providing a local physical interconnection between the elements of the node 200. In accordance with an embodiment of the present invention, the high bandwidth connection 223 has higher bandwidth and/or lower latency than the cluster switching fabric 150. Moreover, the high bandwidth connection 223 described herein refers to the interconnection of elements comprising a single node 200, wherein the interconnection has higher bandwidth and/or lower latency than the cluster switching fabric 150 interconnecting multiple nodes 200. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 1700 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 1700 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

is Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
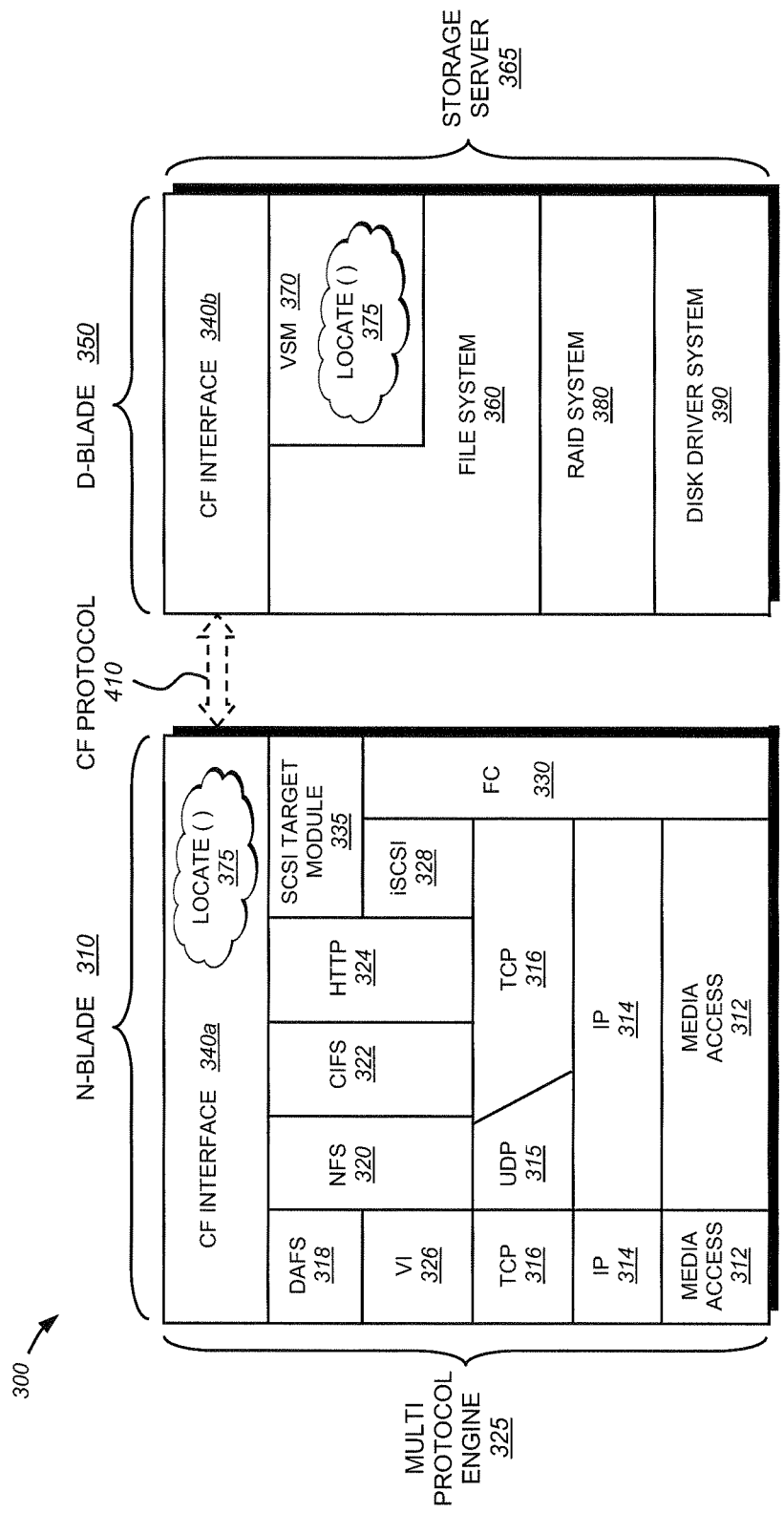
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 1700 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 1700 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 1700. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340*a,b* adapted to implement intra-cluster communication among the blades, including D-blade-to-D-blade communication for data container striping operations described herein.

The protocol layers, e.g., the NFS/CIFS layers and the iSCSI/FC layers, of the N-blade 310 function as protocol servers that translate file-based and block based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. As described further herein, these commands include SVS operations that enable transactional performance in the cluster. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340*a* on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340*b* on D-blade 350 de-encapsulates the CF message and processes the file system command.

Figure 4:
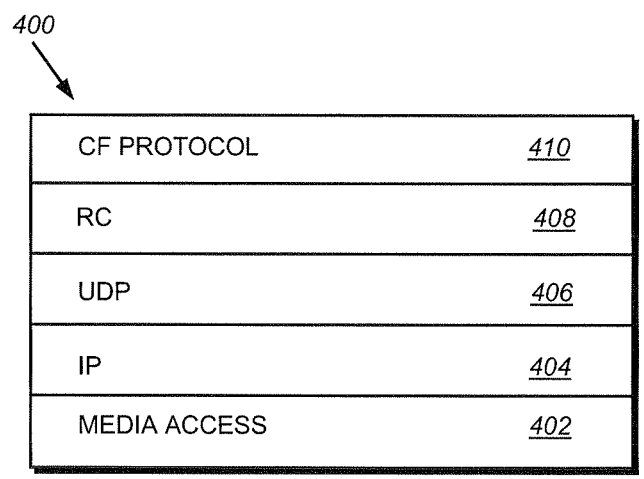
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote blades of the cluster 100; however, it should be understood that the term "CF message" may be used generally to refer to LPC and RPC communication between blades of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-blade 310) to a destination (e.g., a D-blade 350). The RC layer 408 implements a reliable transport protocol that is adapted to process such envelopes in accordance with a connectionless protocol, such as UDP 406.

Figure 5:
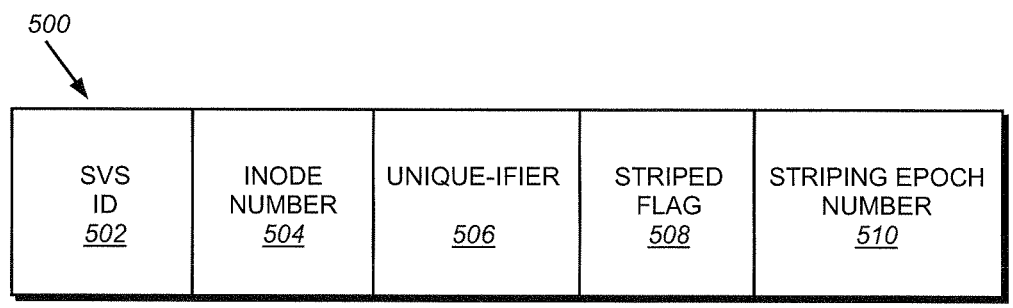
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with the data container for embodiments where the SVS utilizes differing striping techniques for different data containers.

E. File System Organization

Figure 6:
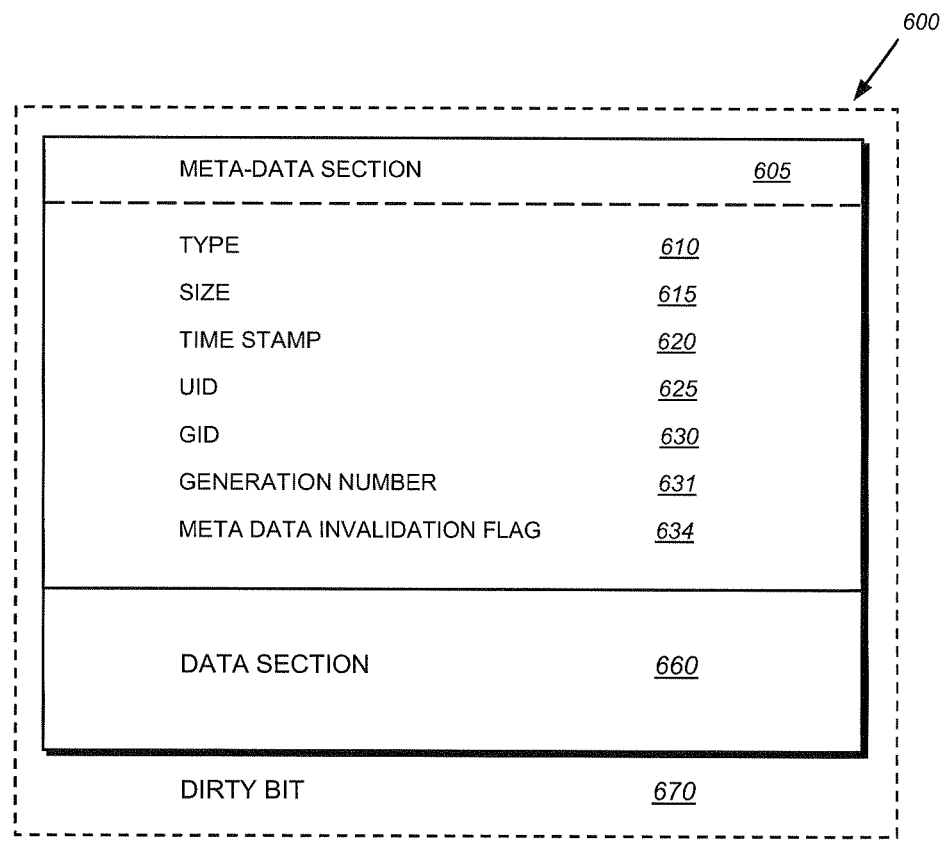
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 634. Meta-data invalidation flag field 634 is used to indicate whether meta-data in this inode is usable or whether it should be re-acquired from a meta-data volume (MDV) of a SVS. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
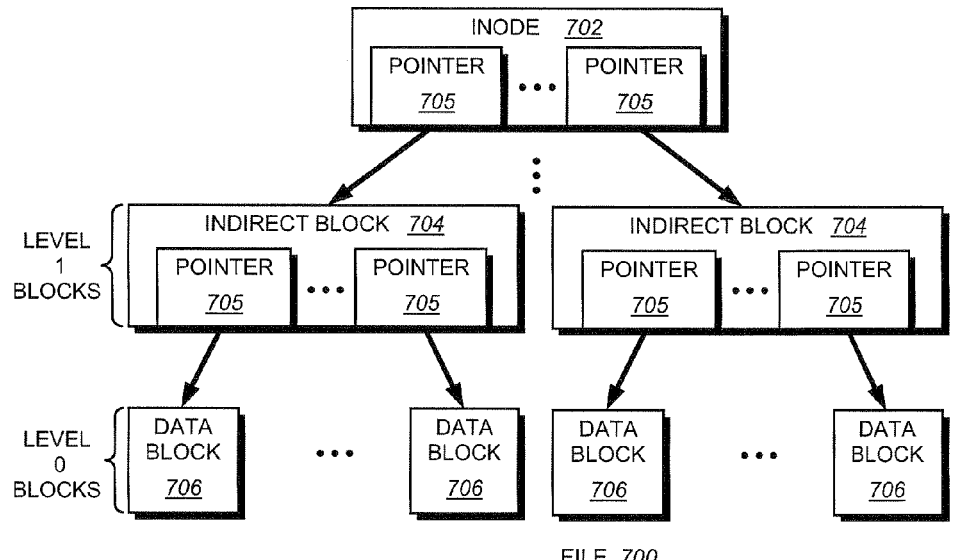
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
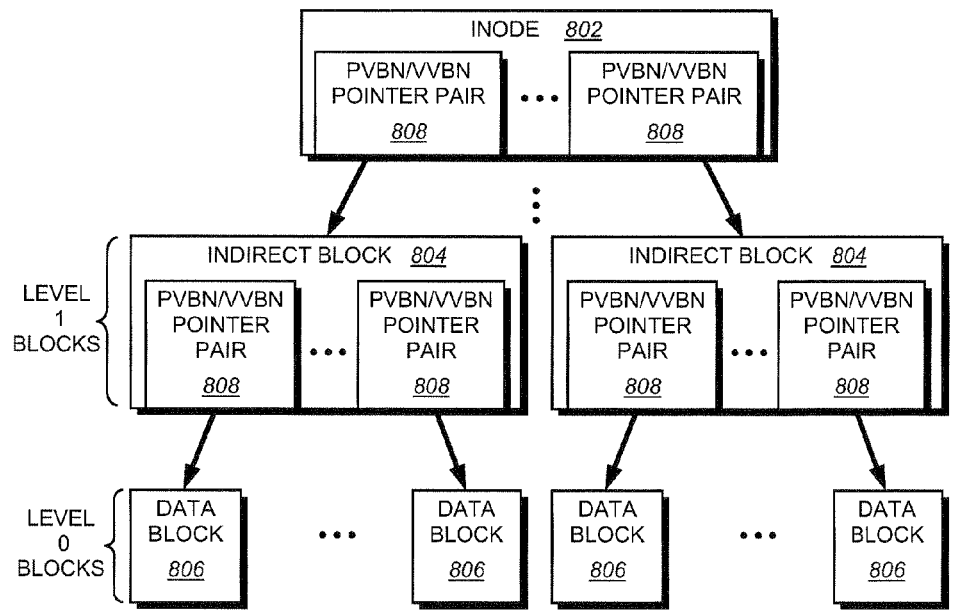
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
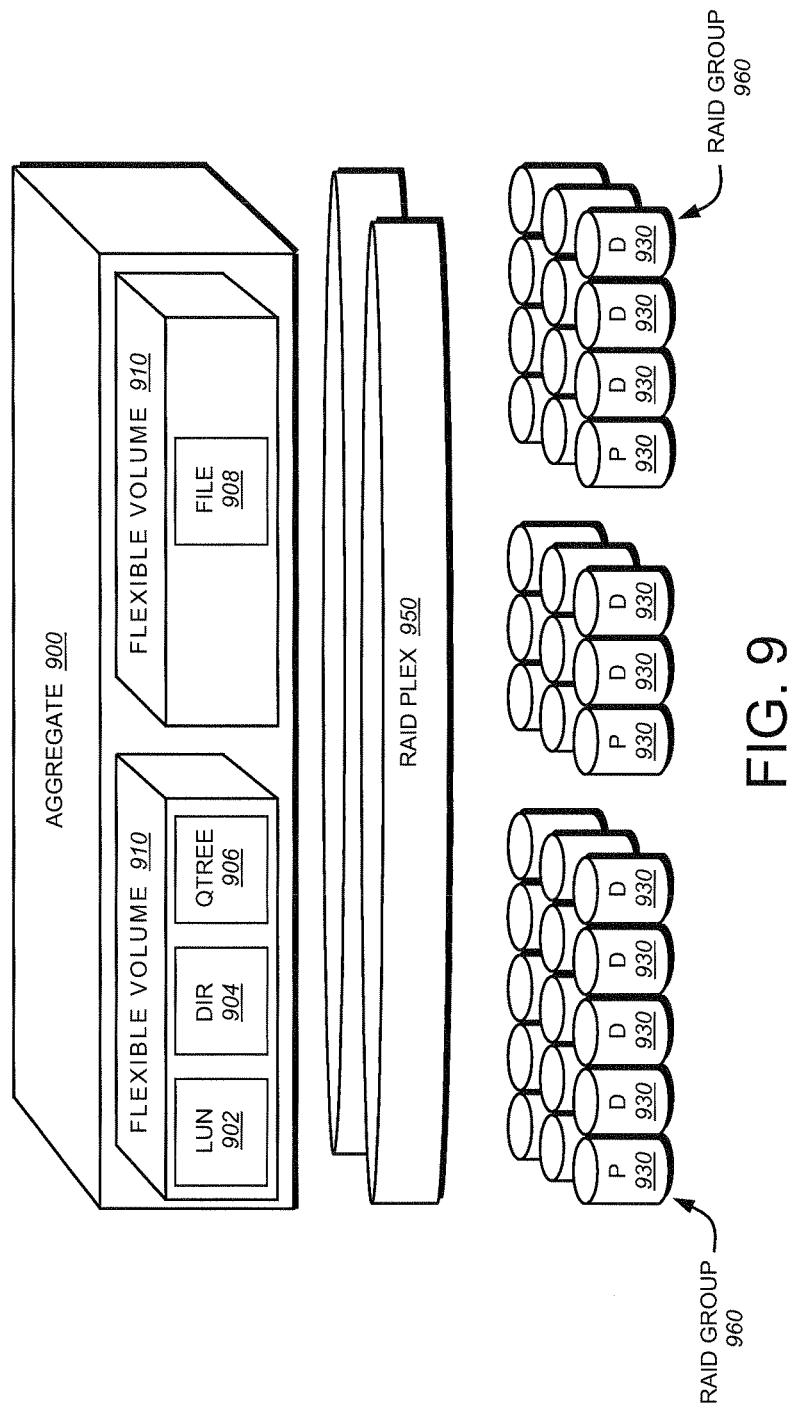
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
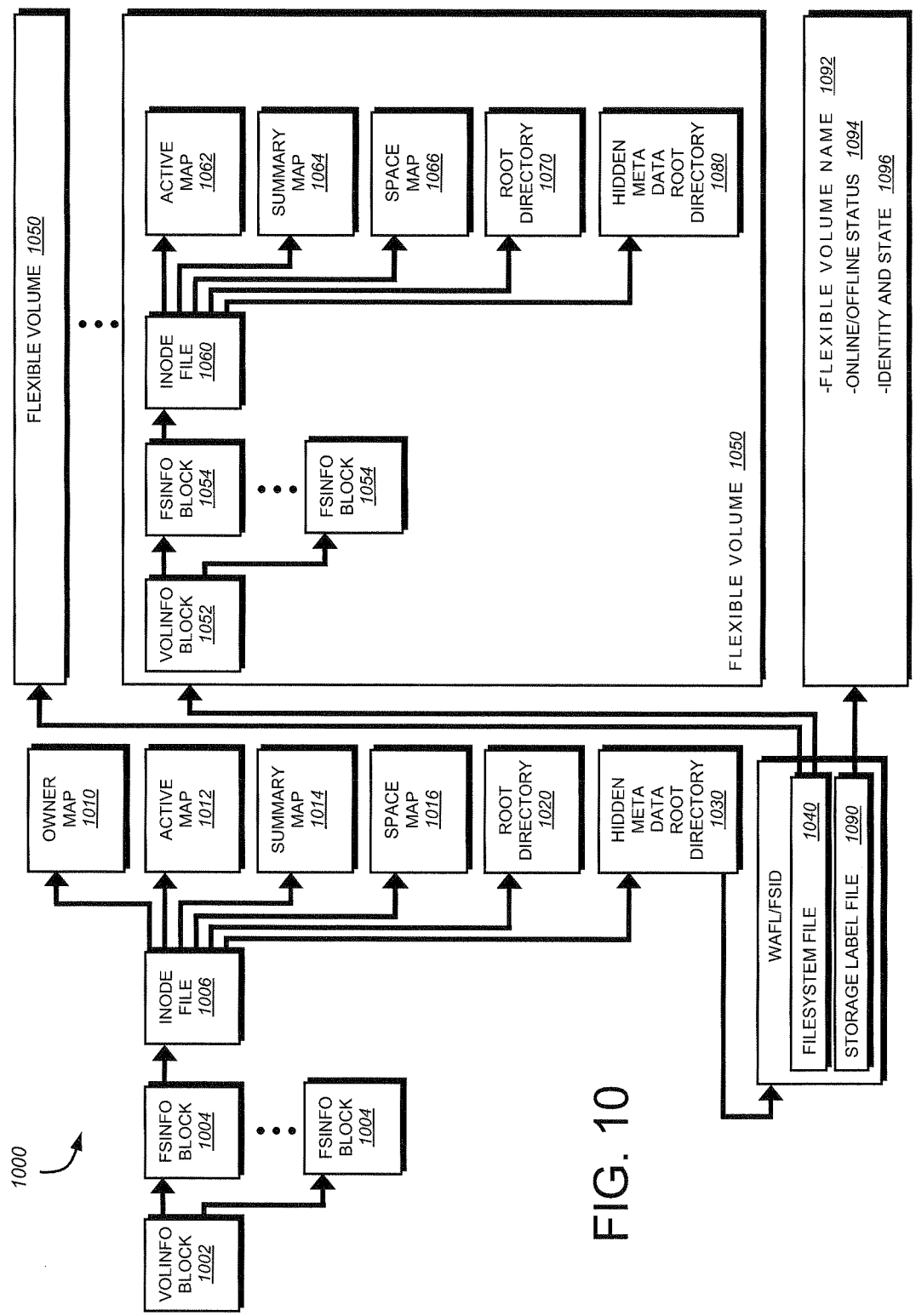
FIG. 10 is a schematic block diagram of an exemplary on-disk layout of an aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
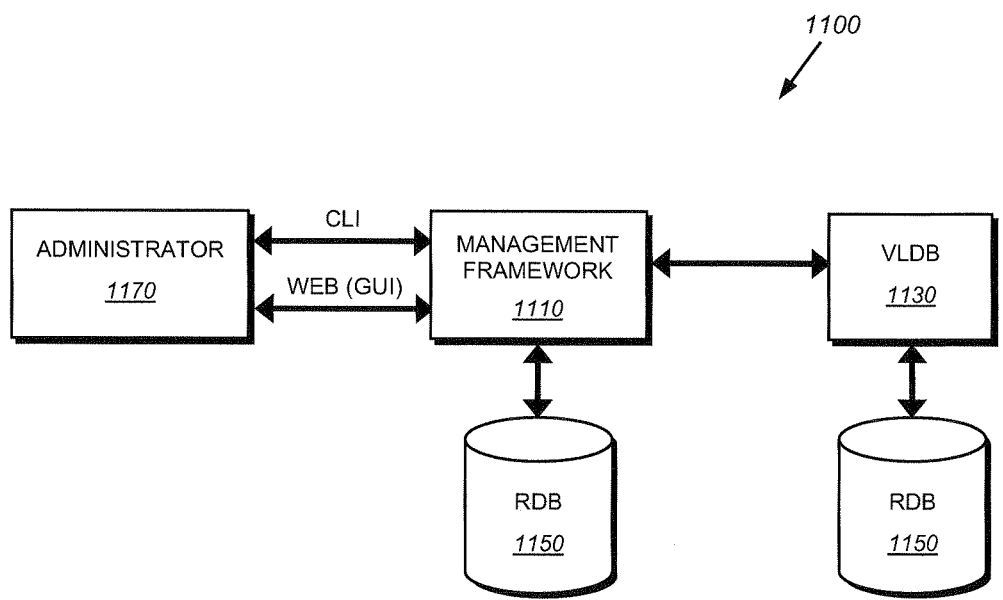
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management is framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-blade 310 of each node accesses a configuration table 235 that maps the SVS ID 502 of a data container handle 500 to a D-blade 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
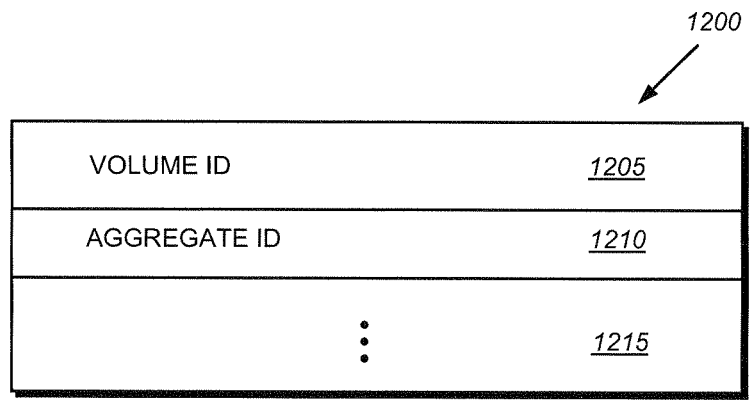
FIG. 12 is a schematic block diagram of a volume location database (VLDB) volume entry in accordance with an embodiment of the present invention.
Figure 13:
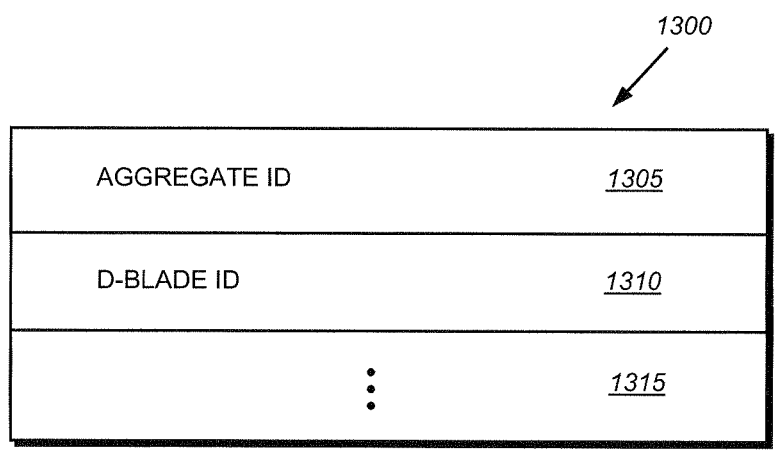
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-blade ID field 1310 and, in alternate embodiments, additional fields 1315. The aggregate ID field 1305 contains an ID of a particular aggregate 900 in the cluster 100. The D-blade ID field 1310 contains an ID of the D-blade hosting the particular aggregate identified by the aggregate ID field 1305.

The VLDB illustratively implements a RPC interface, e.g., a Sun RPC interface, which allows the N-blade 310 to query the VLDB 1130. When encountering contents of a data container handle 500 that are not stored in its configuration table, the N-blade sends an RPC to the VLDB process. In response, the VLDB 1130 returns to the N-blade the appropriate mapping information, including an ID of the D-blade that owns the data container. The N-blade caches the information in its configuration table 235 and uses the D-blade ID to forward the incoming request to the appropriate data container. All functions and interactions between the N-blade 310 and D-blade 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is illustratively directed to a storage system architecture comprising two or more volumes 910 distributed across a plurality of nodes 200 of cluster 100. The volumes are organized as a SVS and configured to store content of data containers, such as files and luns, served by the cluster in response to multi-protocol data access requests issued by clients 1700. Notably, the content of each data container is apportioned among the volumes of the SVS to thereby improve the efficiency of storage service provided by the cluster. To facilitate a description and understanding of the present invention, data containers are hereinafter referred to generally as "files".

The SVS comprises a meta-data volume (MDV) and one or more data volumes (DV). The MDV is configured to store a canonical copy of certain meta-data, including access control lists (ACLs) and directories, associated with all files stored on the SVS, whereas each DV is configured to store, at least, data content of those files. For each file stored on the SVS, one volume is designated a container attribute volume (CAV) and, to that end, is configured to store ("cache") certain, rapidly-changing attribute meta-data, including time stamps and file length, associated with that file to thereby offload access requests that would otherwise be directed to the MDV. In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In an alternate embodiment, data for files is striped across the MDV and the DVs.

Figure 14:
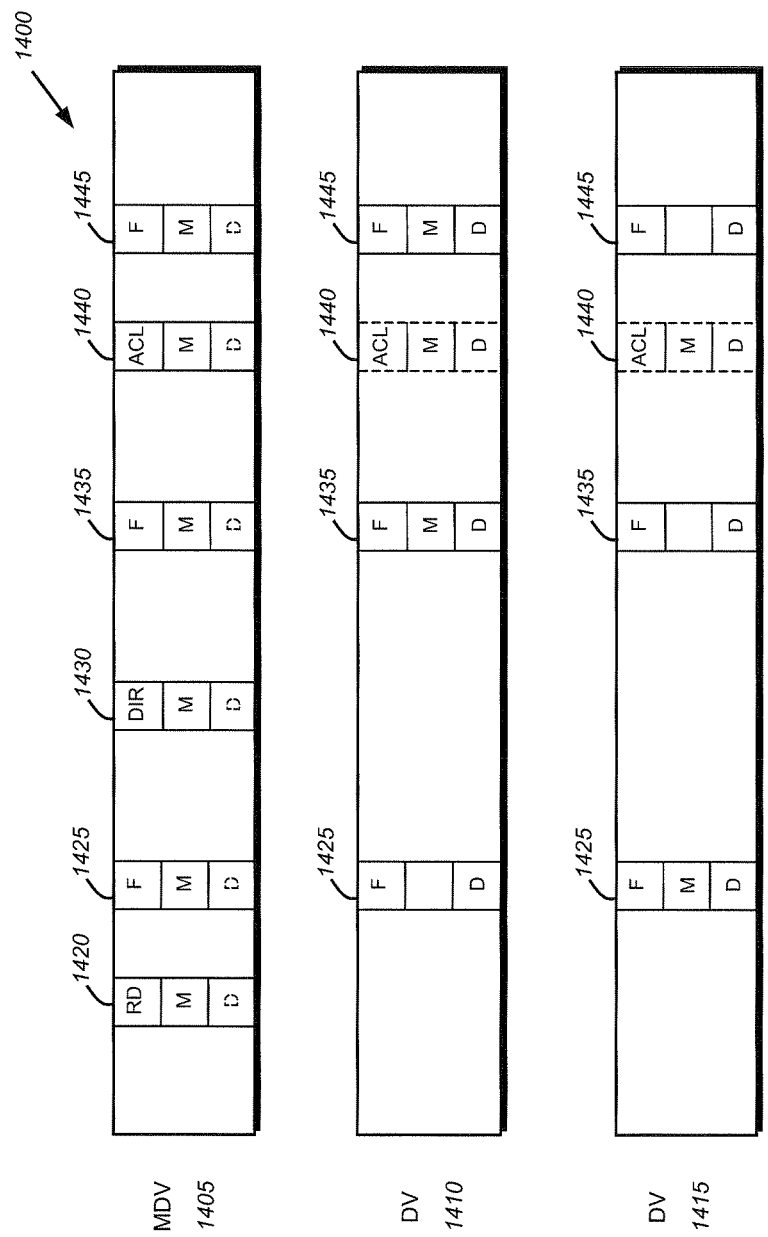
FIG. 14 is a schematic block diagram of a striped volume set (SVS) in accordance with an embodiment of the present invention.

FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. According to the storage system architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-Blade serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time stamps 620.

Figure 15:
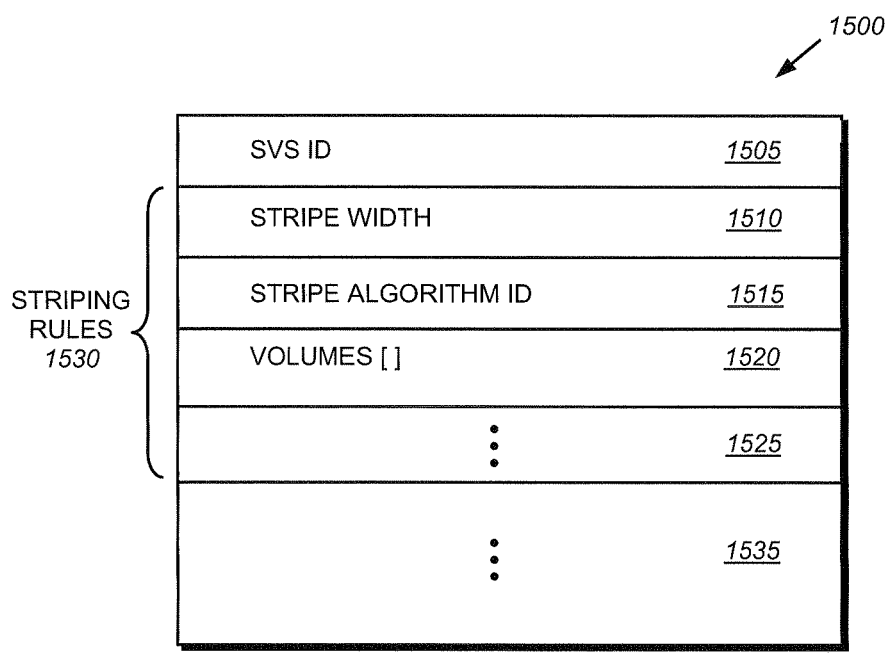
FIG. 15 is a schematic block diagram of a VLDB SVS entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 that may be advantageously used with the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. In an illustrative embodiment, the ordered list of volumes comprises a plurality of tuples including a flexible volume ID and the aggregate ID storing the flexible volume. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

A Locate( ) function 375 is provided that enables the VSM 370 and other modules (such as those of N-blade 310) to locate a D-blade 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 1700 and received at the N-blade 310 of a node 200, where it is parsed through the multi-protocol engine 325 to the appropriate protocol server of N-blade 310.

To determine the location of a D-blade 350 to which to transmit a CF message 400, the N-blade 310 may first retrieve a SVS entry 1500 to acquire the striping rules 1530 (and list of volumes 1520) associated with the SVS. The N-blade 310 then executes the Locate( ) function 375 to identify the appropriate volume to which to direct an operation. Thereafter, the N-Blade may retrieve the appropriate VLDB volume entry 1200 to identify the aggregate containing the volume and the appropriate VLDB aggregate entry 1300 to ultimately identify the appropriate D-blade 350. The protocol server of N-blade 310 then transmits the CF message 400 to the D-blade 350.

Figure 16:
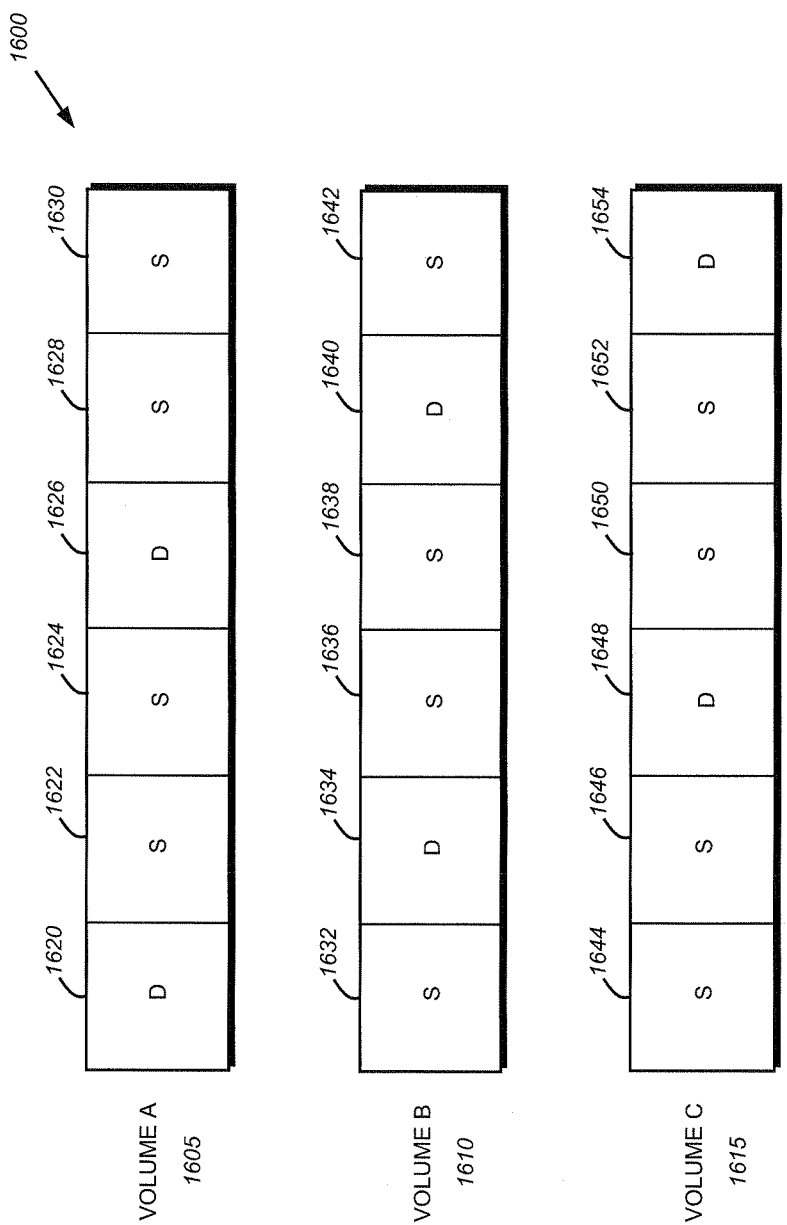
FIG. 16 is a schematic block diagram illustrating the periodic sparseness of file content stored on volumes of a SVS in accordance with an embodiment of the present invention.

FIG. 16 is a schematic block diagram illustrating the periodic sparseness of file content stored on volumes A 1605, B 1610 and C 1615 of SVS 1600 in accordance with an embodiment of the present invention. As noted, file content is periodically sparse according to the SVS striping rules, which specify a striping algorithm (as indicated by stripe algorithm ID field 1515) and a size/width of each stripe (as indicated by stripe width field 1510). Note that, in the illustrative embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume C 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Initializing and Updating a Location Data Structure (LDS)

The present invention is directed to a system and method for determining and accessing, on a per data access request basis, a most optimal path from a client 1700 to one of a plurality of nodes 200 of a cluster configured to serve a plurality of striped volume sets (SVSs). This optimal path is utilized when the client issues a data access request directed to a data container, e.g., a lun, stored on a SVS. Each node 200 is illustratively embodied as a storage system comprising a disk element (D-blade) 350 adapted to serve a volume of a SVS and a network element (N-blade) 310 adapted to direct a data access request to any D-blade 350 of the cluster. A Multi-Pathing Optimization Module (MPOM) 1720 resides on the client 1700, or between the client 1700 and the storage system, and includes a Client_Locate( ) function 1725 that identifies the most optimal path to use when sending a data access request to the cluster. For each SVS that the client 1700 accesses, the associated MPOM 1720 constructs a Location Data Structure (LDS) 2100 containing striping rules 1530 associated with the SVS, a list of N-blades 310 connected to the client 1700, and a list of D-blades 350, each of which is locally connected to a listed N-blade 310 via a high bandwidth system bus 223.

Illustratively, the LDS 2100 resides in memory on the client 1700 and is updated upon initialization of the MPOM 1720 and periodically thereafter. To update the LDS 2100, the client 1700 sends an Update LDS Command to the storage systems operatively connected to the client 1700, and, in response, the systems reply with Update LDS Responses. The Update LDS Commands and the Update LDS Responses are illustratively implemented as vendor-specific SCSI commands, however, in alternate embodiments, they may be implemented using other techniques. Each Update LDS Response contains the striping rules 1530 associated with the SVS and an index 2010 to the local D-blade 350, if any, sharing the system bus 223 with the N-blade 310. The striping rules 1530 include a striping algorithm ID 1515, a stripe width 1510, and a number of striped volumes 2020 comprising the SVS. Illustratively, each D-blade index 2010 identifies the D-blade 350 relative to the striping rules 1530 such that a sequence of volumes across which data is striped corresponds to a sequence of indices 2010 to the D-blades 350 serving those volumes. Thus, the D-blades 350 are indexed according to the striping algorithm. The MPOM 1720 pairs the indices of local D-blades 2010 to indices for the N-blades 2105 such that each pairing 2125 corresponds to a storage system, and the MPOM 1720 writes this information to the LDS 2100. In essence, the MPOM 1720 associated with the client 1700 retrieves and stores the necessary information for executing the Client_Locate( ) function 1725 and for routing a data access request over the optimal path.

Figure 17:
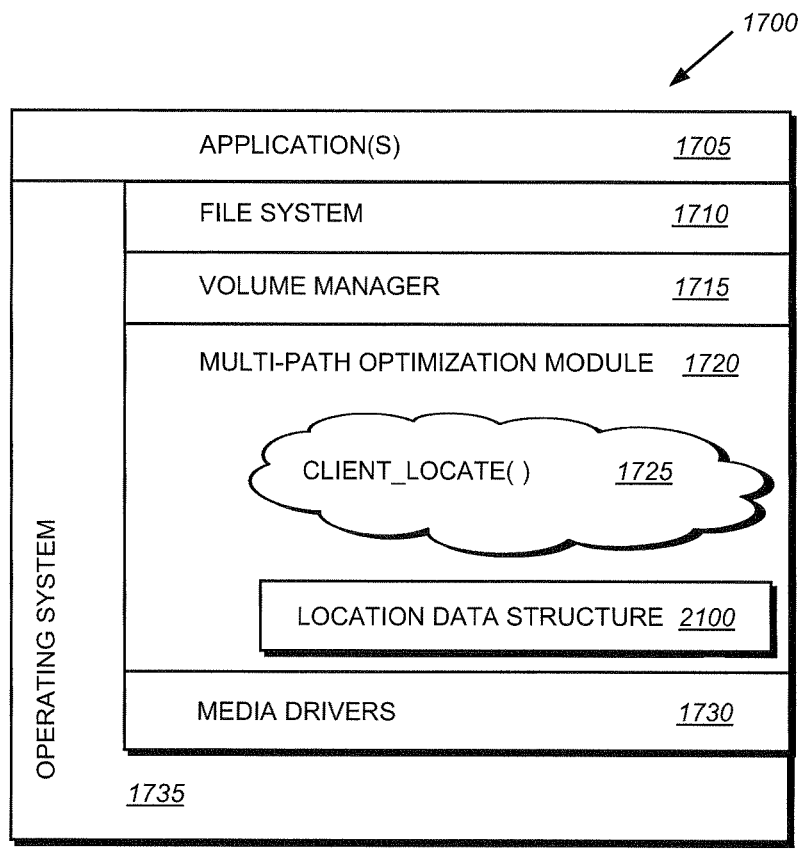
FIG. 17 is a schematic block diagram of various modules executing on a client in accordance with an embodiment of the present invention.

FIG. 17 is a schematic block diagram illustrating various modules executing on a client 1700 that enables the client 1700 to access, on a per data access request basis, the most optimal path to a SVS in accordance with the teachings of the present invention. In the illustrative embodiment, the client 1700 comprises a plurality of software modules including, e.g., application(s) 1705 which interface with an operating system 1735 comprising a file system 1710, a volume manager 1715, a novel Multi-Pathing Optimization Module (MPOM) 1720, and media drivers 1730. The file system 1710 logically organizes information as a hierarchical structure of data containers. For example, the file system 1710 may implement, e.g., New Technology File System (NTFS) introduced by Microsoft® Corporation of Redmond, Wash. The volume manager 1715 performs functions such as aggregating storage devices, aggregating storage bandwidth of storage devices, and providing reliability guarantees, such as mirroring and/or parity checksumming (RAID). The media drivers 1730 interface with the network 140 to communicate data access requests to the nodes 200. The MPOM 1720 cooperates with the file system 1710, volume manager 1715, and media drivers 1730 within the operating system 1735 in a manner that is "transparent" to applications 1705 running on the client 1700, so that the applications 1705 may access the file system 1710 without requiring any modification to accommodate the MPOM 1720. The MPOM 1720 contains a Client_Locate( ) function 1725 which uses information stored in a Location Data Structure (LDS) 2100 to determine the most optimal path to a storage system. The operating system 1735 is configured to activate the MPOM 1720 automatically when the operating system 1735 is initialized (e.g., when the client machine is powered on), and the MPOM 1720 remains active concurrently with the operating system 1735. In an alternate embodiment, the MPOM 1720 may be included within or added to the media drivers 1730 which are activated by the operating system 1735.

According to an alternate embodiment, the MPOM 1720 is not "transparent" to applications 1705 running on the client 1700 such that the applications 1705 may interface with the MPOM 1720 to control pathing (e.g., by specifying preferred paths) or to retrieve relevant pathing information or statistics (e.g., number of data access requests being routed through cluster switching fabric 150). Likewise, the operating system 1735 or applications 1705 may activate or disable the MPOM 1720 depending on, e.g., network conditions or user commands.

According to an alternate embodiment, the file system and/or the volume manager functionality is integrated into the application(s) 1705, e.g., Oracle® Database 10g with Automatic Storage Management (ASM) available from Oracle Corporation of Redwood Shores, Calif. In such embodiments, the MPOM 1720 may interface with the file system or volume manager functionality within the application 1705 to determine and access, on a per data access request basis, the most optimal path from the client 1700 to the storage system. Alternatively, the MPOM 1720 may be included within or added to the file system or volume manager functionality of the application 1705.

In an alternate embodiment, the MPOM 1720 may be a hardware device, e.g., an application-specific integrated circuit (ASIC), operatively interconnected between the client 1700 and the nodes 200. The MPOM 1720 intercepts data access requests from the client 1700 and directs them using the most optimal path. In such an embodiment, the MPOM 1720 may be configured to intercept data access requests from multiple clients 1700.

Figure 18:
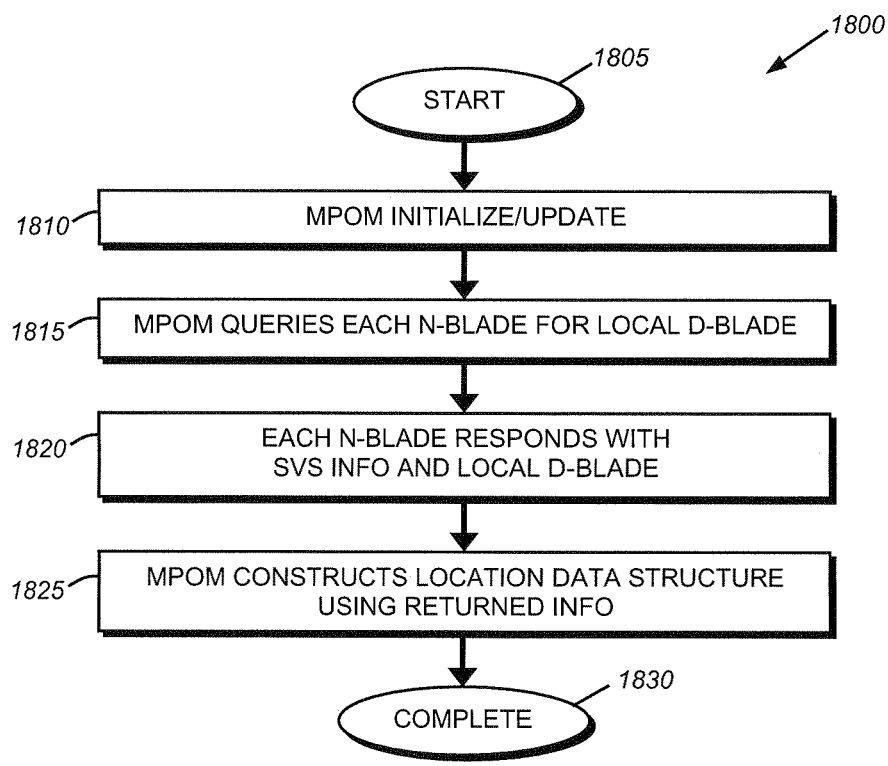
FIG. 18 is a flowchart detailing the steps of a procedure for initializing/updating a Location Data Structure (LDS) in accordance with an embodiment of the present invention.

FIG. 18 is a flowchart detailing the steps of a procedure 1800 for initializing and updating a Location Data Structure (LDS) 2100 in accordance with an embodiment of the present invention. For each SVS accessible by a client 1700, the MPOM 1720 constructs a LDS 2100 containing striping rules 1530, a list of N-blades connected to the client 2105, and a list of D-blades 2010 locally connected to the listed N-blades 2105 via a high bandwidth connection 223, e.g., a shared system bus. The LDS 2100 is stored in memory on the client 1700 or, in alternate embodiments, in a persistent data storage, e.g., a local disk drive. The procedure 1800 begins in step 1805 and continues to step 1810 where the MPOM 1720 either is initialized for the first time or is performing an update. Updates may be, e.g., in response to a command from the client 1700, in response to a signal from the nodes 200, periodic, or otherwise triggered by predetermined conditions. In step 1815, the MPOM 1720 sends an Update LDS Command to each N-blade which is operatively connected to the client 1700. In step 1820, each N-blade sends an Update LDS Response back to the client 1700. Illustratively, the Update LDS Command and the Update LDS Response are implemented as vendor-specific SCSI commands; however, in alternate embodiments, they may be implemented using other techniques. Using vendor-specific SCSI commands permits in-band retrieval of LDS information. Alternately, the N-blade may export an application program interface (API) that is accessible via, e.g., remote procedure calls (RPCs). As such, the use of vendor-specific SCSI commands should be taken as exemplary only. Using data from the Update LDS Responses, the MPOM 1720 constructs or updates the LDS 2100 in step 1825. The procedure 1800 then completes in step 1830.

Figure 19:
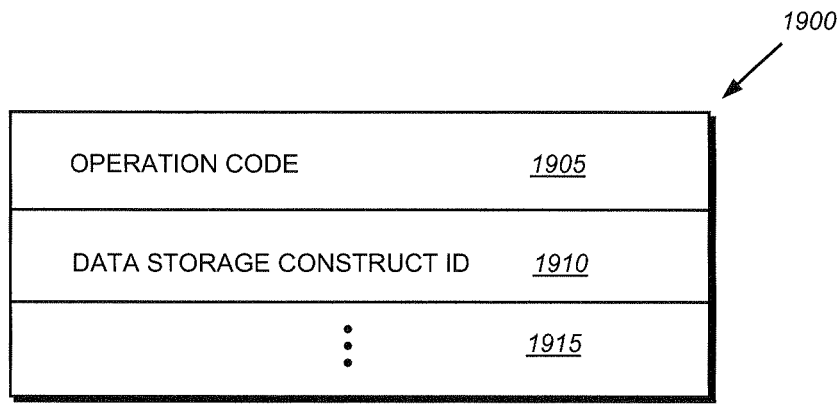
FIG. 19 is a schematic block diagram of an Update LDS Command data structure in accordance with an embodiment of the present invention.

FIG. 19 is a schematic block diagram of a vendor-specific SCSI Update LDS Command data structure 1900 in accordance with the illustrative embodiment of the present invention. It should be noted that, in alternate embodiments, the Update LDS Command may be implemented in other ways including, for example, in another protocol specification. The illustrative Update LDS Command data structure 1900 includes an operation code field 1905, a data storage construct identifier (ID) field 1910, and, in alternate embodiments, additional fields 1915. The operation code field 1905 identifies the command as an Update LDS Command. The data storage construct ID field 1910 identifies a particular data storage construct within the storage system that is exported to the client 1700. Illustratively, the data storage construct ID 1910 for a SVS may be the SVS ID 1505 from the VLDB SVS entry 1500, if this ID is known to the client 1700, or, alternately, a unique identifier shared between the client 1700 and the cluster identifying, e.g., a lun stored within a SVS as a vdisk. To that end, the MPOM 1720 may query a N-blade 310 for information about a single data storage construct among a plurality of data storage constructs if the N-blade 310 is servicing multiple constructs. For example, where an application 1705 on the client 1700 seeks to access one of a plurality of luns, the MPOM 1720 may send a lun ID as the data storage construct ID 1910, which the N-blade 310 would recognize as corresponding to a vdisk on a SVS instead of the SVS ID 1505. In a NAS environment, the SVS ID 1505 is available to the client 1700 as an element of the data container handle 500. In an alternate embodiment, the MPOM 1720 may send a particular operation code 1905, data storage construct ID 1910, or additional field 1915, to query the N-blade 310 for information about all data storage constructs operatively connected to that N-blade 310 or all data storage constructs of a particular type. For example, the MPOM 1720 may query the N-blade 310 for information about all luns stored within a SVS as vdisks.

Figure 20:
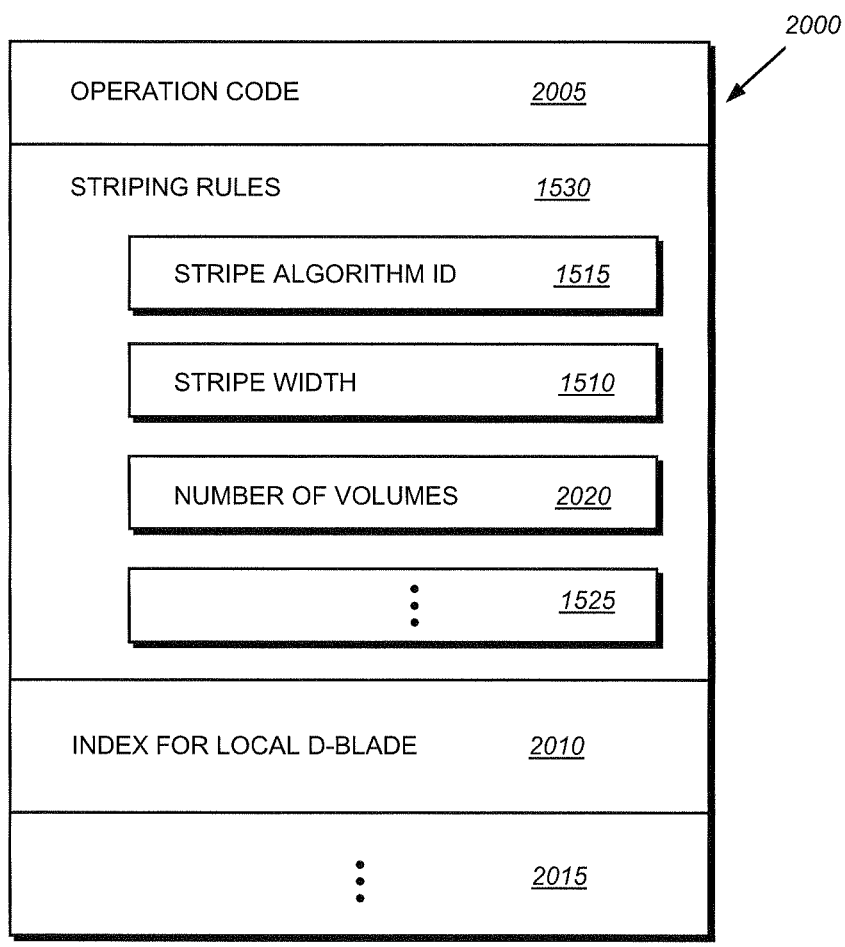
FIG. 20 is a schematic block diagram of an Update LDS Response data structure in accordance with an embodiment of the present invention.

FIG. 20 is a schematic block diagram of a vendor-specific SCSI Update LDS Response data structure 2000 issued by a N-blade 310 in accordance with an illustrative embodiment of the present invention. The Update LDS Response illustratively contains an operation code 2005, a striping rules field 1530, an index field 2010 to the local D-blade 350 of the N-blade 310, and, in alternate embodiments, additional fields 2015. The N-blade 310 may contain software or hardware which periodically collects and buffers the information necessary to generate an Update LDS Response data structure 2000, or the N-blade 310 may collect the information and generate the Response contemporaneously upon receiving an Update LDS Command. Illustratively, the N-blade 310 implements the functionality described above to retrieve a SVS entry 1500 (FIG. 15) from which to acquire the striping rules 1530 (and number of volumes 2020) associated with the SVS. The striping rules 1530 contain a striping algorithm field 1515, a stripe width field 1510, a number of striped volumes field 2020, and, in alternate embodiments, additional fields 1525. Illustratively, the local D-blade index 2010 identifies the local D-blade 350 relative to the striping rules 1530 such that the sequence of volumes across which data is striped corresponds to the sequence of indices 2010 to the D-blades 350 serving those volumes. Thus, the D-blades 350 of all nodes 200 serving a SVS are indexed according to the striping algorithm 1515. Illustratively, the D-blade indices 2010 may start from "1" and be sequentially numbered according to the sequence of volumes in the striping algorithm 1515. For example, given a round-robin striping algorithm 1515 applied to three or more volumes of a SVS, the D-blade 350 operatively connected to the third volume would have a D-blade index 2010 of "3".

Alternately, the N-blade 310 may implement the functionality described above to retrieve the appropriate VLDB volume entry 1200 (FIG. 12) to identify the aggregate 1210 containing the volume 1205 and the appropriate VLDB aggregate entry 1300 (FIG. 13) to identify the D-blade ID 1310, which may then be used as the local D-blade index 2010. The additional fields 2015 of the Update LDS Response 2000 and the additional fields 1525 of the striping rules 1530 may contain other useful information or statistics which the client 1700 is configured to receive, e.g., number of data access requests being routed to this N-blade 310 from other clients.

According to an alternate embodiment, in addition to or instead of containing a number of striped volumes field 2020, the striping rules 1530 may contain the complete array of indices for the D-blades 350, the array of indices corresponding to the array of volumes 1520 from the SVS entry 1500 for the given SVS. The N-blade 310 may implement the functionality described above to retrieve the array of volumes 1520, (FIG. 15) correlate the volume IDs 1205 to aggregate IDs 1210 to D-blade IDs 1310, (FIGS. 12, 13) and use these D-blade IDs 1310 as the array of D-blade indices.

According to another alternate embodiment, the N-blade 310 receiving the Update LDS Command is not connected to a D-blade 350 via a high bandwidth connection 223 because, e.g., the storage system is configured to have more N-blades 310 than D-blades 350. Therefore, the index to local D-blade field 2010, in the Update LDS Response 2000 from this node 200, may contain a predetermined value which indicates that this N-blade 310 does not have a local D-blade 350. Alternately, the index to local D-blade field 2010 may contain an arbitrary value, and an additional field 2015 of the Update LDS Response would indicate that this N-blade 310 lacks a local D-blade 350.

Figure 21:
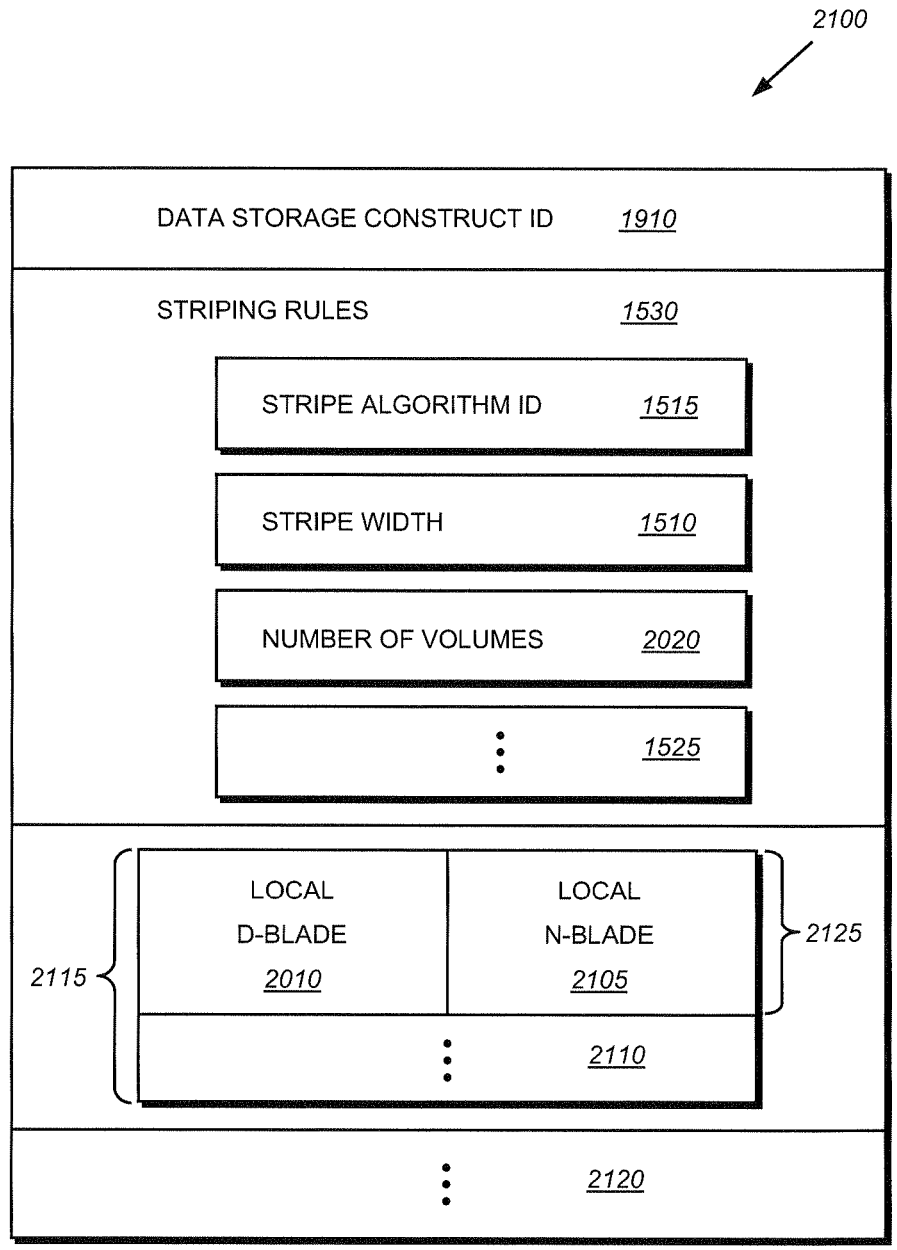
FIG. 21 is a schematic block diagram of a LDS in accordance with an embodiment of the present invention.

FIG. 21 is a schematic block diagram of a Location Data Structure (LDS) 2100 in accordance with an illustrative embodiment of the present invention. The LDS 2100 is constructed and updated by the MPOM 1720 using information from Update LDS Responses sent by the N-blades 310 operatively connected to the client 1700. For each data storage construct, the LDS 2100 contains a data storage construct ID 1910, the striping rules 1530, a two dimensional array 2115 of local D-blade indices 2010 and N-blade indices 2105, and, in alternate embodiments, additional fields 2120. The striping rules 1530 may be copied directly from a Update LDS Response data structure 2000. Illustratively, the index to local D-blade field 2010, from a given Update LDS Response data structure 2000, is paired with an index to local N-blade field 2105 such that each pair 2125 corresponds to a node 200. In alternate embodiments, where a single N-blade 310 may have a plurality of local D-blades 350, each pair 2125 corresponds to a N-blade 310 to local D-blade 350 pairing. The pairs of indices to D and N-blades 2010, 2105 form the rows 2125 of the two dimensional array 2115, wherein the length of the array corresponds to the number of N-blades 310 operatively connected to the client 1700. Illustratively, for each N-blade 310 which sends an Update LDS Response to the client 1700, a new row 2110 is added to the array 2115, the new row 2110 containing indices to the D and N-blades 2010, 2105 associated with the Response. The local D-blade index 2010 may be copied directly from an Update LDS Response data structure 2000. The corresponding local N-blade index 2105 may be a value assigned by the MPOM 1720, identifying the node 200.

It is expressly contemplated that the cluster may be configured such that there is an unequal number of N and D-blades. It is likewise expressly contemplated that the client 1700 may not be operatively connected to every N-blade 310 of the storage system or that some data access requests must be routed through the cluster switching fabric 150 in order to reach certain D-blades 350 and disks 130. For example, in FIG. 1, data access requests from the client 1700 to data managed by D-blade 350C and stored on disk 130C must be routed through either N-blade 310A or 310B, neither of which share a high bandwidth connection 223 with D-blade 350C. Because the client 1700 only receives Update LDS Responses from N-blades 310 to which the client 1700 is operatively connected, the client 1700 of FIG. 1 will not receive an Update LDS Response from a N-blade local to D-blade 350C. Thus, according to the illustrative embodiment, the array of D and N-blade indices 2115 will not contain a row 2125 or local D-blade index 2010 corresponding to D-blade 350C of FIG. 1. Likewise, when the storage system is configured to have more N-blades 310 than D-blades 350, the array 2115 may contain a row 2125 containing only a local N-blade index 2105 and an empty or null local D-blade index 2010. Under these circumstances, the present invention will still function, as described further below, in reference to FIG. 22.

According to alternate embodiments, the LDS 2100 structure may be varied to store additional information, enabling additional functionality in the MPOM 1720. For example, the LDS 2100 may be structured to retain (and the N-blades 310 to send) all D-blade indices 2010 such that the MPOM 1720 has access to a "complete picture" of the storage system, regardless of operative connections to the client 1700. Likewise, columns may be added to the array 2115 to store additional information about the N-blades 310 (e.g., overall rate of traffic flow through a N-blade 310), the additional information being calculated by the MPOM 1720 or returned in additional fields 2015 of the Update LDS Response data structures 2000. Moreover, as generally illustrated in FIG. 18, by receiving Update LDS Response from each N-blade 310 operatively connected to a client 1700 and storing the received information in a LDS 2100, an MPOM 1720, associated with the client 1700, retrieves and stores the information necessary for routing each data access request using the most optimal path, i.e. to an N-blade 310 that shares a high bandwidth connection 223 with the D-blade 350 to which the data access request is directed.

I. Routing a Data Access Request Using the Most Optimal Path

Operationally, a data access request from the client 1700 to a data container stored on the SVS is intercepted by the MPOM 1720, which executes the Client_Locate( ) function 1725 to identify the appropriate N-blade 310 associated with the optimal path. Given an offset within a data container stored on a SVS, the Client_Locate( ) function 1725 retrieves the striping rules 1530 from the LDS 2100 to identify the D-blade index 2010 for the volume containing the desired data. The MPOM 1720 then checks the list of local D-blade indices 2010 previously provided by the N-blades 310 during initialization to determine whether the identified D-blade index 2010 is paired with an N-blade index 2105. When the client 1700 possesses an operative connection to an N-blade 310 having a high bandwidth connection 223 to the identified D-blade 350, the pairing 2125 of an N-blade index 2105 to the identified D-blade index 2010 identifies a corresponding storage system, and the data access request is routed to this system to optimize performance. Specifically, the MPOM 1720 routes the request to the N-blade 310 paired with the identified D-blade 350 in the LDS 2100. Conversely, when the client 1700 lacks an operative connection to an N-blade 310 having a high bandwidth connection 223 to the identified D-blade 350, there is no pairing 2125 of an N-blade index 2105 to the identified D-blade index 2010, and the MPOM 1720 defaults to an alternative method for selecting an N-blade 310 to which to route the data access request (e.g., using a least-queue-depth algorithm). Thus, when possible, the MPOM 1720 routes a data access request along the most optimal path from a client 1700 to a storage system serving a SVS by routing the request directly to the N-blade 310 residing on the same storage system as the D-blade 350 identified by the Client_Locate( ) function 1725, thereby utilizing the high bandwidth connection 223 between the N and D-blades 310, 350, rather than the cluster switching fabric 150.

Figure 22:
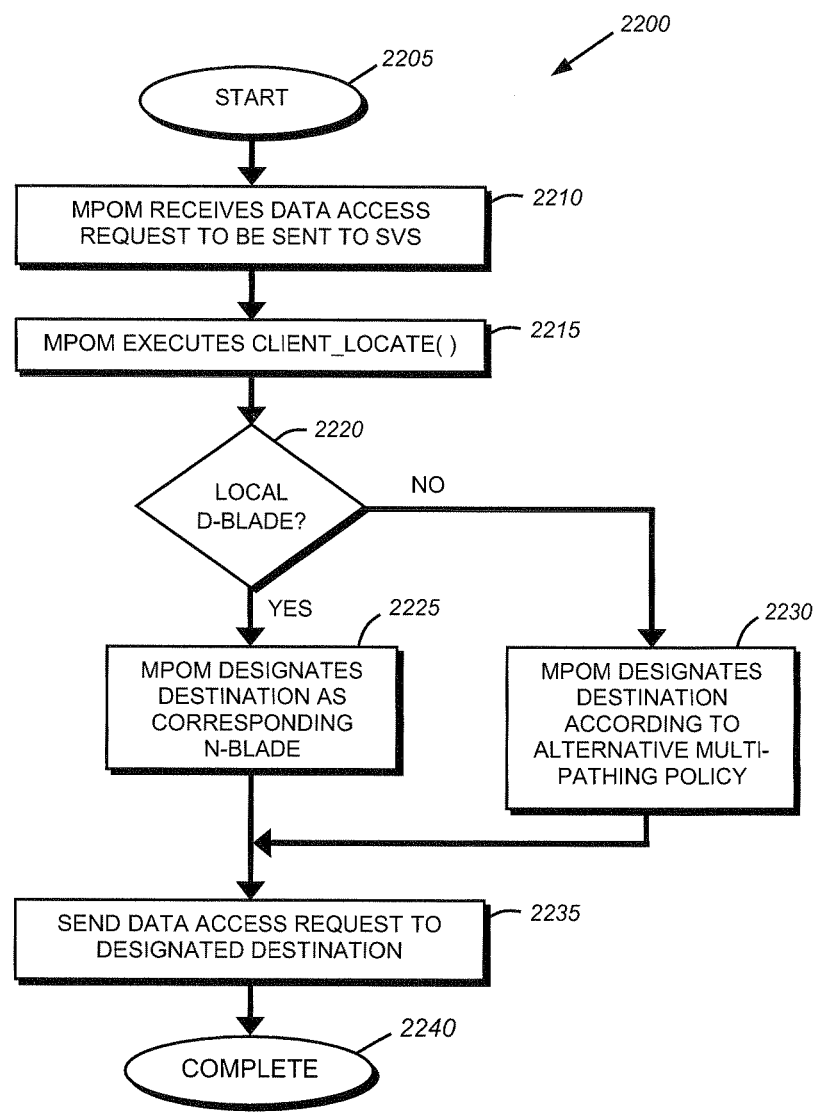
FIG. 22 is a flowchart detailing the steps of a procedure for directing a data access request using the most optimal path in accordance with an embodiment of the present invention.

Once the necessary information is stored in a LDS 2100, the MPOM 1720 may route a data access request from the client 1700 to a data container stored on a data storage construct (e.g., SVS) using the most optimal path. FIG. 22 is a flowchart detailing the steps of a procedure 2200 for routing a data access request using the most optimal path, in accordance with an illustrative embodiment of the present invention. The procedure 2200 begins at step 2205 and continues to step 2210 where a data access request from a client 1700 to a SVS is automatically intercepted by the MPOM 1720. As noted above, the data container may comprise a file, a lun or any other addressable data object. The data container may be accessed using any suitable protocol including, e.g., iSCSI, FCP, NFS, etc. This may be by the file system 1710 and/or volume manager 1715 passing a data access request to the MPOM 1720. Alternately, the MPOM 1720 may be directly invoked by another module of the client 1700. In step 2215, the MPOM 1720 executes the Client_Locate( ) function 1725. Illustratively, the Client_Locate( ) function 1725 operates similarly to the Locate( ) function 375 described above, in reference to FIG. 15, to identify a D-blade 350 and its associated volume of a SVS 1400 in order to service an access request to a data container. Illustratively, as described above in reference to FIG. 5, a data container, e.g., a file or a logical unit number (lun), is accessed using a data container handle 500 which includes, e.g., the SVS ID 502 and inode number 504 for the data container. Given (i) a SVS ID 502, (ii) an offset within the data container, (iii) the inode number 504 for the data container, and (iv) a set of striping rules 1530 (stored in the LDS 2100), Client_Locate( ) 1725 returns the index for the D-blade 350 which is operatively connected to the volume 910 on which that offset begins within the SVS 1400. Thus, on a per data access request basis, the Client_Locate( ) function 1725 identifies the D-blade 350 through which the data access request will be routed.

At step 2220, the MPOM 1720 checks the list of local D-blade indices 2010 previously provided by the N-blades 310 during the initialization/update procedure 1800. As noted, during the initialization/update procedure 1800, each N-blade 310 operatively connected to the client 1700 returns a respective local D-blade index 2010 as part of the Update LDS Response data structure 2000. Thus, when the client 1700 possesses an operative connection to an N-blade 310 which shares a high bandwidth connection 223 with the D-blade 350 identified at step 2215, the identified D-blade index 2010 appears in the array 2115 of the LDS 2100. Conversely, according to the illustrative embodiment, when the identified D-blade 350 does not share a high bandwidth connection 223 with a N-blade 310 operatively connected to the client 1700, the identified D-blade index 2010 does not appear in the array 2115 of the LDS 2100.

If the D-blade index 2010 identified by the Client_Locate( ) function 1725 appears in the array 2115, then the MPOM 1720 continues to step 2225 and retrieves the N-blade index 2105 paired with the identified D-blade index 2010. As also noted, during the initialization/update procedure 1800, each D and N-blade index pair forms a row 2125 of the array 2115, and each row 2125 corresponds to a N-blade/local D-blade pair operatively connected to the client 1700. According to the illustrative embodiment, the MPOM 1720 designates this retrieved N-blade index 2105 as the destination for the data access request. The procedure 2200 then continues to step 2235 where the data access request is sent to the designated destination N-blade 310. Since the N-blade 310 receiving the data access request shares a high-bandwidth connection 223 the D-blade 350 identified by the Locate( ) function 375, the request does not need to be routed through cluster switching fabric 150. Thus, the MPOM 1720 has routed the data access request using the most optimal path, because the high bandwidth connection 223 typically has higher bandwidth and/or lower latency than the cluster switching fabric 150. At step 2240, the procedure 2200 is complete.

However, if the D-blade index 2010 identified by the Client_Locate( ) function 1725 does not appear in the array 2115, then the procedure continues to step 2230 where the MPOM 1720 defaults to an alternative multi-pathing policy for designating a destination N-blade 310 (e.g., using a least-queue-depth algorithm). The procedure then continues to step 2235 where the data access request is sent to the designated N-blade 310. Thus, as in storage system configurations similar to FIG. 1, utilization of the cluster switching fabric 150 may be inevitable given certain data access requests, and, lacking an operative connection to the node 200 containing the D-blade 350 through which a request must be routed, the MPOM 1720 routes the request according to an alternative multi-pathing policy. At step 2240, the procedure completes.

In an alternate embodiment, the MPOM 1720 may be optimized for meta-data-related data access requests. Illustratively, as discussed above in reference to FIG. 14, the SVS comprises a meta-data volume (MDV) 1405 and one or more data volumes (DVs) 1410, 1415. For example, in FIG. 1, a volume serviced by D-blade 350A may serve as the MDV 1405. Thus, all meta-data-related data access requests are routed through D-blade 350A. The MPOM 1720 may recognize meta-data-related data access requests, e.g., by recognizing the type of data access request. Alternately, a module on the client 1700, e.g., the operating system 1735 or volume manager 1715, may specify the data access request as meta-data-related, e.g., by interfacing with the MPOM 1720 or by marking the data access request. Given additional information, e.g., stored in an additional field 2120 of the LDS 2100, identifying the node 200A serving the MDV 1405, the MPOM 1720 may designate the destination N-blade 310A without executing Client_Locate( ) 1725 or the N-to-D-blade identification steps 2220, 2225 of the route optimization procedure 2200. Thus, processing by the MPOM 1720 may be reduced for data access requests directed to the MDV 1405. Likewise, given information identifying the CAV for a given file, the MPOM 1720 may identify data access requests directed to the CAV and similarly designate the destination N-blade 310 without executing Client_Locate( ) 1725 or the N-to-D-blade identification steps 2220, 2225.

It is expressly contemplated that the storage system architecture may change during runtime, e.g., by adding or removing disks 130 and/or network connections 140. Thus, although the LDS 2100 may indicate that the client 1700 is operatively connected to the identified D-blade 350, the information in the LDS 2100 might not be perfectly synchronized with changes in the storage system architecture. Therefore, the MPOM 1720 may include functionality for designating a new destination N-blade 310 (using, e.g., an alternative multipathing policy) when the client 1700 is unable to communicate with the originally designated N-blade 310. Likewise, the Locate( ) function 375, executing on the nodes 200, may route a data access request through the cluster switching fabric 150 to the proper D-blade 350 after an architecture change. Additionally, a misdirected data access request may trigger the client 1700 or node 200 to send an Update LDS Command 1900 or Response 2000, respectively.

According to an alternate embodiment, the MPOM 1720 may use additional information stored in additional fields 2120 of the LDS 2100 to determine the most optimal path for a data access request. For example, the nodes 200 may provide traffic flow information in the additional fields 2015 of the Update LDS Response data structures 2000, which the MPOM 1720 might use to determine an alternative multipathing policy. Likewise, the MPOM 1720 may use information or commands provided by the operating system 1735 or applications 1705 (e.g., database applications which include file system and volume manager functionality) to disqualify, alter, or override the designated N-blade result of steps 2225 or 2230. Moreover, the path selection functionality of the MPOM 1720 may be configured to take advantage of any of the alternate embodiments contemplated above with respect to the storage system, the client 1700, the LDS 2100, the Up-date LDS Command 1900, and the Update LDS Response 2000.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for directing a data access request to one of a plurality of network elements operatively connected to one or more destination storage elements of a cluster, comprising:

identifying a destination storage element connected through a storage adapter to a storage device with data requested by the data access request;

identifying a first network element configured to receive the data access request through a first network adapter, the first network element sharing a first connection with the destination storage element using a cluster switching fabric;

identifying a second network element configured to receive the data access request through a second network adapter, the second network element sharing a second connection with the destination storage element without use of the cluster switching fabric;

determining that the second network element, and not the first network element, is identified in a list of local destination storage element indices provided by one or more of the plurality of network elements indicating that each of the one or more network elements shares a respective second connection with a respective disk storage element; and in response to determining that the second network element, and not the first network element, is identified in the list, designating the second network element instead of the first network element to receive the data access request, wherein the second connection is a higher speed connection than the first connection.

2. The method of claim 1 wherein the data access request comprises a SCSI command.

3. The method of claim 1 wherein the data access request comprises a SCSI command encapsulated in TCP/IP.

4. The method of claim 1 wherein the data access request comprises a SCSI command encapsulated in Fibre Channel.

5. The method of claim 1 further comprising serving, by the one or more destination storage elements, a plurality of volumes organized into a striped volume set, wherein the striped volume set is defined by a set of striping rules.

6. The method of claim 5 wherein identifying the destination storage element comprises:

providing an offset within a data container stored on the striped volume set; and identifying the destination storage element using at least one of the set of striping rules, the indices, and the offset.

7. The method of claim 6 further comprising serving, by the destination storage element, a volume of the plurality of volumes including the offset within the data container.

8. The method of claim 6 wherein the indices identify the one or more destination storage elements relative to the set of striping rules such that a sequence of the plurality of volumes across which the data is striped corresponds to a sequence of indices to the one or more storage elements serving the plurality of volumes.

9. The method of claim 6 wherein the data container comprises a file.

10. The method of claim 6 wherein the data container comprises a logical unit number.

11. The method of claim 6 wherein the indices are provided in a response to a command sent to the one or more of the plurality of network elements.

12. The method of claim 11 wherein the command comprises a vendor-specific SCSI command.

13. The method of claim 11 wherein the response comprises a vendor-specific SCSI command.

14. The method of claim 5 wherein one of the plurality of volumes of the striped volume set is defined as a meta-data volume.

15. The method of claim 14 wherein identifying the destination storage element comprises identifying the data access request as meta-data related.

16. The method of claim 1 further comprising interfacing one or more software modules with a multi-pathing optimization module (MPOM) for identifying the destination storage element, identifying the one or more of the plurality of network elements, and directing the data access request.

17. The method of claim 1 wherein the second connection comprises a shared system bus.

18. A system for directing a data access request from a client to one of a plurality of network elements operatively connected to one or more destination storage elements of a storage system cluster, comprising:

means for identifying a destination storage element serving a storage device with data requested by the data access request;

means for identifying a first network element configured to receive the data access request, the first network element sharing a first connection with the destination storage element using a cluster switching fabric;

means for identifying a second network element configured to receive the data access request, the second network element sharing a second connection with the destination storage element without use of the cluster switching fabric;

means for determining, by a processor, that the second network element, and not the first network element, is identified in a list of local destination storage element indices provided by one or more of the plurality of network elements indicating that each of the one or more network elements shares a respective second connection with a respective destination storage element; and means for designating the second network element instead of the first network element to receive the data access request in response to determining that the second network element and not the first network element is identified in the list, wherein the second connection is a higher speed connection than the first connection.

19. The system of claim 18 wherein the data access request comprises a SCSI command.

20. The system of claim 18 wherein the data access request comprises a SCSI command encapsulated in TCP/IP.

21. The system of claim 18 wherein the data access request comprises a SCSI command encapsulated in Fibre Channel.

22. The system of claim 18 further comprising means for serving, by the one or more destination storage elements, a plurality of volumes organized into a striped volume set, wherein the striped volume set is defined by a set of striping rules.

23. The system of claim 22 further comprising:

means for providing an offset within a data container stored on the striped volume set; and means for identifying the destination storage element using at least one of the set of striping rules, the means for identifying at least one of the one or more storage elements sharing the second connection with the one or more network elements, and the offset.

24. The system of claim 23 wherein the data container comprises a file.

25. The system of claim 23 wherein the data container comprises a logical unit number.

26. The system of claim 23 wherein the indices identify the one or more destination storage elements relative to the set of striping rules such that a sequence of the plurality of volumes across which the data is striped corresponds to a sequence of indices to the one or more storage elements serving the plurality of volumes.

27. The system of claim 23 wherein the indices are provided in a response to a command sent to one or more of the plurality of network elements.

28. The system of claim 27 wherein the command comprises a vendor-specific SCSI command.

29. The system of claim 27 wherein the response comprises a vendor-specific SCSI command.

30. The system of claim 18 wherein the second network element shares the second connection with the destination storage element, the second connection comprising a shared system bus.

31. A system for directing a data access request received from a client, comprising:
- at least one processor;
- a multi-pathing optimization module (MPOM) configured to operatively connect to a cluster of nodes, the cluster of nodes including a plurality of network elements configured to operatively interconnect to one or more destination storage elements, wherein the cluster is configured to serve a data container stored on a plurality of storage devices;
- the MPOM further configured to identify a first network element of the plurality of network elements sharing a first connection with a destination storage element using a cluster switching fabric, the MPOM further configured to identify a second network element sharing a second connection with the destination storage element without use of the cluster switching fabric, the MPOP further configured to determine that the second network element and not the first network element is identified in a list of local destination storage element indices provided by one or more of the plurality of network elements indicating that each of the one or more network elements shares a respective second connection with a respective disk storage element, the MPOM further configured to designate the second network element instead of the first network element to receive the data access request in response to determining that the second network element and not the first network element is identified in the list, wherein the second connection is a higher speed connection than the first connection.

32. The system of claim 31 wherein the MPOM comprises a software module configured to interface with an operating system of the client.

33. The system of claim 31 wherein the MPOM comprises a hardware device operatively connected between the client and the one or more network elements.

34. The system of claim 31 wherein the second connection comprises a physical connection between the second network element and the destination storage element.

35. The system of claim 31 wherein the plurality of storage devices include a plurality of volumes organized into a striped volume set, the striped volume set defined by a set of striping rules.

36. The system of claim 35
- wherein the data access request comprises an offset within the data container, and wherein the data container is stored on the striped volume set; and
- wherein the MPOM is further configured to identify the destination storage element using the set of striping rules, the indices, and the offset.

37. The system of claim 31 wherein the MPOM is further configured to interface with a location data structure (LDS) comprising the indices and the set of striping rules.

38. The system of claim 36 wherein the data container comprises a file.

39. The system of claim 36 wherein the data container comprises a logical unit number.

40. The system of claim 31 wherein the MPOM is further configured to designate the first network element to receive the data access request, the first network element designated according to an alternative multi-pathing policy in response to lacking an operative connection to the second network element.

41. The system of claim 31 wherein the data access request comprises a SCSI command.

42. The system of claim 31 wherein the data access request comprises a SCSI command encapsulated in TCP/IP.

43. The system of claim 31 wherein the data access request comprises a SCSI command encapsulated in Fibre Channel.

* * * * *

UNITED STATES PATENT AND TRADEMARK OFFICE
CERTIFICATE OF CORRECTION

| | | |
|---|---|---|
| PATENT NO. | : 8,566,845 B2 | Page 1 of 1 |
| APPLICATION NO. | : 11/748344 | |
| DATED | : October 22, 2013 | |
| INVENTOR(S) | : Vijayan Rajan | |

It is certified that error appears in the above-identified patent and that said Letters Patent is hereby corrected as shown below:

In the Specification

In Col. 7, line 40 should read:
Execute as user ~~inode~~mode applications 1100 (see FIG. 11). The In Col. 10, line 27 should read:
~~minoring~~mirroring and/or parity (RAID). The file system 360 illustra- In Col. 15, line 15 should read:
(e.g., ~~Mode~~inode or indirect block). On a read path of a logical In Col. 15, line 18 should read:
which, in turn, points to an ~~Mode~~inode file and its corresponding In Col. 15, line 19 should read:
~~Mode~~inode buffer tree. The read path on a flexible volume is In Col. 21, line 61/62 should read:
devices, and providing reliability guarantees, such as ~~minoring~~mirroring and/or parity checksumming (RAID). The media drivers Signed and Sealed this
Eleventh Day of February, 2014

Michelle K. Lee
*Deputy Director of the United States Patent and Trademark Office*